(12) United States Patent
Li et al.

(10) Patent No.: US 12,476,729 B2
(45) Date of Patent: Nov. 18, 2025

(54) NETWORK NODE SUCH AS BASE STATION FOR HANDLING MODULATION AND CODING SCHEME (MCS) RELATED INFORMATION AND METHOD THEREFOR

(71) Applicant: Samsung Electronics Co., Ltd., Suwon-si (KR)

(72) Inventors: Yan Li, Beijing (CN); Huiyang Wang, Beijing (CN); Huan He, Beijing (CN); Guangcan Yan, Beijing (CN); Jiajia Wang, Beijing (CN); Yi Zhao, Beijing (CN); Meifang Jing, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 18/335,781

(22) Filed: Jun. 15, 2023

(65) Prior Publication Data

US 2023/0361908 A1    Nov. 9, 2023

Related U.S. Application Data

(63) Continuation of application No. PCT/KR2023/006229, filed on May 8, 2023.

(30) Foreign Application Priority Data

May 9, 2022   (CN) .......................... 202210503060.X
Mar. 17, 2023  (CN) .......................... 202310274426.5

(51) Int. Cl.
*H04W 24/02*   (2009.01)
*H04L 1/00*    (2006.01)

(52) U.S. Cl.
CPC .......... *H04L 1/0003* (2013.01); *H04L 1/0009* (2013.01); *H04W 24/02* (2013.01)

(58) Field of Classification Search
CPC ............. H04W 24/02; H04W 72/0446; H04W 52/262; H04W 52/367; H04W 52/26;
(Continued)

(56) References Cited

U.S. PATENT DOCUMENTS 9,596,053 B1    3/2017  Marupaduga et al.
9,998,271 B2    6/2018  Ko et al.
(Continued)

FOREIGN PATENT DOCUMENTS

KR      10-2039343 B1     10/2019
KR      10-2021-0050454 A  5/2021
(Continued)

OTHER PUBLICATIONS

China Mobile Sun Qi: Intelligent development and exploration of radio access network, http://www.cww.net.cn/article?id=487507, May 26, 2021, 4 pages, C114 Communication Network.
(Continued)

*Primary Examiner* — Wei Zhao
(74) *Attorney, Agent, or Firm* — Nixon & Vanderhye P.C.

(57) ABSTRACT

An example embodiment may provide a method to be performed by a base station and/or a network node, and relevant devices. The method may include: acquiring channel related information of a target user equipment (UE); acquiring a modulation and coding scheme (MCS) determined based on MCS related information, the MCS related information being acquired by an artificial intelligence (AI) network based on the channel related information; and, transmitting the determined MCS to the target UE, the target UE comprising an edge UE, the number of MCS change value of the edge UE being greater than the number of MCS change value of a center UE. The steps in this scheme can be implemented by a trained artificial intelligence method. The corresponding MCS related information may be
(Continued)

acquired by an AI network based on the channel related information of the target UE, and the MCS of the target UE may then be determined by using the acquired MCS related information. Since the MCS related information acquired by the AI network can accurately reflect the channel state of the target UE, the determined MCS is more accurate, and the user throughput is thus improved.

20 Claims, 27 Drawing Sheets

(58) Field of Classification Search
CPC ... H04W 72/044; H04L 1/0001; H04L 1/0009
See application file for complete search history.

(56) References Cited

U.S. PATENT DOCUMENTS

| | | | |
|---|---|---|---|
| 11,071,172 B2 * | 7/2021 | He | H04W 52/0251 |
| 11,979,754 B2 | 5/2024 | Bedekar et al. | |
| 2010/0284454 A1 | 11/2010 | Oteri et al. | |
| 2013/0107839 A1 | 5/2013 | Seki | |
| 2013/0310091 A1 | 11/2013 | Tabet et al. | |
| 2014/0293899 A1 | 10/2014 | Ko et al. | |
| 2016/0112977 A1 * | 4/2016 | Byun | H04W 72/541 |
| | | | 370/350 |
| 2022/0014963 A1 | 1/2022 | Yeh et al. | |
| 2022/0095128 A1 | 3/2022 | Landis et al. | |
| 2022/0191881 A1 | 6/2022 | Fan et al. | |
| 2023/0090593 A1 | 3/2023 | Kim | |
| 2024/0365246 A1 * | 10/2024 | Baldemair | H04L 27/2615 |

FOREIGN PATENT DOCUMENTS

| | | |
|---|---|---|
| KR | 20220061002 A | 5/2022 |
| KR | 10-2460673 B1 | 10/2022 |
| WO | WO2021167119 A1 | 8/2021 |
| WO | 2022257157 A1 | 12/2022 |

OTHER PUBLICATIONS

Go Y et al., A Study on Effective SINR Prediction Model for DNN-Based MCS Selection, Korea Maritime and Ocean University(KMOU), Electronics and Telecommunications Research Institute(ETRI), Unknown, 2 pages.
Wenqiong S et al., Ericsson launches to reduce the overall energy consumption of 5G networks, http://www.c114.com.cn/news/118/a1162999.html, Jun. 15, 2021, 1 page, CWW.
PCT International Search Report dated Aug. 24, 2023 for PCT/KR2023/006229.
PCT Written Opinion dated Aug. 24, 2023 for PCT/KR2023/006229.
Partial Supplementary Search Report dared Jun. 5, 2025 for EP Application No. 23803788.1.
Extended European Search Report dated Sep. 29, 2025 for EP Application No. 23803788.1.

* cited by examiner

1100

| BLER | $T_1$ | $T_2$ | $T_3$ | $T_4$ | $T_5$ | $T_6$ | $T_7$ | $T_8$ |
|---|---|---|---|---|---|---|---|---|
| $L_1$ | x | x | x | x | 0 | 0 | 0 | 0 |
| $L_2$ | x | x | x | x | 0 | 0 | 0 | 0 |
| ... | x | x | x | x | 0 | 0 | 0 | 0 |
| $L_{36}$ | x | x | x | x | 0 | 0 | 0 | 0 |

| Preset Time Window | T₁ | T₂ | T₃ | T₄ | T₅ | T₆ | T₇ | T₈ |
|---|---|---|---|---|---|---|---|---|
| The number of effective decoding feedbacks | x | x | x | x | 0 | 0 | 0 | 0 |

| Cell Scenario | Description | $\alpha$ value |
|---|---|---|
| Urban Microcell | e.g., shopping centers, high-density buildings rapid channel change | 1 |
| Urban Macrocell | e.g., low-density buildings medium-speed channel change | 0.8 |
| Rural Macrocell | e.g., rural regions slow channel change | 0.6 |

FIG. 14A

NETWORK NODE SUCH AS BASE STATION FOR HANDLING MODULATION AND CODING SCHEME (MCS) RELATED INFORMATION AND METHOD THEREFOR

This application is a continuation application of international application No. PCT/KR2023/006229, filed on May 8, 2023, which is based on and claims the benefit of Chinese patent application number 202210503060.X filed on May 9, 2022; and Chinese patent application number 202310274426.5 filed on Mar. 17, 2023, the disclosures of each of which are hereby entirely incorporated by reference herein.

BACKGROUND

Field

Certain example embodiments relate to wireless communication, and for example to a method executed by a base station and/or a network node, and relevant device(s).

Description of Related Art

In a communication system, as a basic technology for ensuring system performance, the link adaptation technology is to dynamically select a modulation and coding scheme (MCS) based on the estimated or predicted instantaneous channel condition so as to ensure the maximum user throughput. The channel quality indication (CQI) is periodically reported, and the CQI cannot reflect the real-time user channel quality due to the influences from channel fading, the user's movement speed, neighboring cell interference or the like, so the link adaption technology is needed to track the user channel quality in real time and then select an appropriate MCS.

In the existing link adaptation schemes, the scheme of channel tracking by using the long-term historical report information and the fixed adjustment step, cannot satisfy MCS adjustment requirements in a scenario of rapid channel change. Therefore, it is necessary to provide a new link adaptation method. Specifically, in the prior art, the long-term signal to interference plus noise ratio (SINR) is estimated by using the statistical mean of the CQI in a long period, and the short-term SINR offset is acquired based on the fixed adjustment step. However, the obtained real-time SINR cannot satisfy the MCS adjustment requirements in the scenario of rapid channel change. Therefore, it is necessary to provide a new link adaptation method.

The above information is presented as background information only to assist with an understanding of the disclosure. No determination has been made, and no assertion is made, as to whether any of the above might be applicable as prior art with regard to the disclosure.

SUMMARY

Certain example embodiments solve at least one of the above technical defects.

In the first aspect, an example embodiment provides a method executed by a base station, comprising:
acquiring channel related information of a target user equipment (UE);
acquiring a modulation and coding scheme (MCS) determined based on MCS related information, the MCS related information being obtained by an artificial intelligence (AI) network based on the channel related information; and
transmitting the determined MCS to the target UE;
wherein the target UE includes an edge UE, and the number of MCS change value of the edge UE is greater than the number of MCS change value of a center UE.

In an example embodiment, the acquiring an MCS determined based on MCS related information may comprise:
predicting, by the first AI network, a short-term SINR offset corresponding to the target UE based on the channel related information;
acquiring MCS related information corresponding to the target UE based on the short-term SINR offset; and
determining an MCS corresponding to the target UE based on the determined MCS related information.

In an example embodiment, the predicting, by the first AI network, a short-term SINR offset corresponding to the target UE based on the channel related information may comprise:
acquiring first block error rate (BLER) information corresponding to the target UE based on a decoding feedback value fed back by the target UE, the first BLER information containing BLERs of different preset time windows under different preset SINR offsets; and
predicting, by the first AI network, the short-term SINR offset corresponding to the target UE based on the first BLER information.

In an example embodiment, each of the different preset time windows may be different in length.

In an example embodiment, the acquiring first block error rate (BLER) information corresponding to the target UE based on a decoding feedback value fed back by the target UE may comprise:
acquiring an actual SINR offset corresponding to each time unit within a preset historical period of time and the decoding feedback value fed back by the target UE; and
acquiring the first BLER information based on the actual SINR offset corresponding to each time unit within the preset historical period of time and the decoding feedback value fed back by the target UE.

In an example embodiment, the acquiring the first BLER information based on the actual SINR offset corresponding to each time unit within the preset historical period of time and the decoding feedback value fed back by the target UE may comprise:
for each preset time unit, determining, based on the actual SINR offset corresponding to the preset time unit and the decoding feedback value fed back by the UE, a decoding feedback value of the preset time unit under a preset SINR offset;
for each preset time window, acquiring, based on decoding feedback values of each preset time unit within the preset time window under different preset SINR offsets, BLERs of the preset time window under different preset SINR offsets; and
acquiring the first BLER information based on the BLERs of each preset time window under different preset SINR offsets.

In an example embodiment, the determining, based on the actual SINR offset corresponding to the preset time unit and the decoding feedback value fed back by the UE, a decoding feedback value of the preset time unit under a preset SINR offset may comprise:

if the decoding feedback value fed back by the UE corresponding to the preset time unit is acknowledgement (ACK), determining the decoding feedback value of the preset time unit under the preset SINR offset as ACK; and if the decoding feedback value fed back by the UE corresponding to the preset time unit is negative acknowledgement (NACK), determining the decoding feedback value of the preset time unit under a preset SINR offset greater than the actual SINR offset as NACK, and determining the decoding feedback value of the preset time unit under a preset SINR offset less than the actual SINR offset as ACK.

In an example embodiment, the predicting, by the first AI network, the short-term SINR offset corresponding to the target UE based on the first BLER information may comprise:

acquiring the second BLER information based on a movement feature and/or position feature of the target UE and the first BLER information; and predicting, by the first AI network, the short-term SINR offset corresponding to the target UE based on the second BLER information.

In an example embodiment, the acquiring the second BLER information based on a movement feature and/or position feature of the target UE and the first BLER information may comprise:

selecting, based on the movement feature of the target UE, an effective preset time window from the preset time window contained in the first BLER information, and/or selecting, based on the position feature of the target UE, an effective preset SINR offset from the preset SINR offset of the first BLER information; and determining the second BLER information based on the effective preset time window and/or the effective preset SINR offset.

In an example embodiment, the determining the second BLER information based on the effective preset time window and/or the effective preset SINR offset may include:

setting BLERs other than the BLER corresponding to the effective preset time window and/or the effective preset SINR offset in the first BLER information as zero to obtain the second BLER information.

In an example embodiment, the predicting, by the first AI network, the short-term SINR offset corresponding to the target UE based on the second BLER information may comprise:

acquiring effective decoding feedback number information of the target UE, the effective decoding feedback number information including the number of effective decoding feedbacks corresponding to a preset time window in which each BLER in the second BLER information is not zero; and predicting, by the first AI network, the short-term SINR offset corresponding to the target UE based on the second BLER information and the effective decoding feedback number information.

In an example embodiment, the predicting, by the first AI network, the short-term SINR offset corresponding to the target UE based on the second BLER information and the effective decoding feedback number information may comprise:

acquiring corresponding predicted BLER information based on the second BLER information, the predicted BLER information including first predicted BLERs of each time window under different preset SINR offsets;

acquiring a predicted weight corresponding to each time window based on the predicted BLER information and the effective decoding feedback number information;

for each preset SINR offset, weighting, based on the predicted weight corresponding to each time window, the first predicted BLER corresponding to each time window under the preset SINR offset to obtain the second predicted BLER corresponding to the preset SINR offset; and acquiring, from each preset SINR offset, the short-term SINR offset based on the second predicted BLER corresponding to each preset SINR offset.

In an example embodiment, the acquiring corresponding predicted BLER information based on the second BLER information may comprise:

acquiring, by a feature extraction module (comprising processing circuitry) in the first AI network, a distribution feature of BLERs in each preset time window based on the second BLER information; and acquiring, by a BLER prediction module (comprising processing circuitry) in the first AI network, the predicted BLER information based on the distribution feature.

In an example embodiment, the acquiring a predicted weight corresponding to each time window based on the predicted BLER information and the effective decoding feedback number information may comprise:

acquiring, by an attention module (comprising processing circuitry) in the first AI network, a change feature of the first predicted BLER with different preset SINR offsets in different preset time windows based on the predicted BLER information, acquiring the number of effective decoding feedbacks in different preset time windows based on the effective decoding feedback number information, and acquiring a predicted weight corresponding to each preset time window based on the change feature and the number of effective decoding feedbacks.

In an example embodiment, the acquiring, from each preset SINR offset, the short-term SINR offset based on the second predicted BLER corresponding to each preset SINR offset may comprise:

acquiring, by a short-term SINR offset prediction module (comprising processing circuitry) in the first AI network, the throughput of the target UE under each preset SINR offset based on the second predicted BLER corresponding to each preset SINR offset; and determining, as the short-term SINR offset, a preset SINR offset corresponding to the a maximum or high throughput in each preset SINR offset.

In an example embodiment, the method further may comprise:

predicting, by the second AI network, a long-term SINR corresponding to the target UE based on the channel related information; and the acquiring MCS related information corresponding to the target UE based on the short-term SINR offset includes:

acquiring the MCS related information corresponding to the target UE based on the short-term SINR offset and the long-term SINR.

In an example embodiment, the predicting, by the second AI network, a long-term SINR corresponding to the target UE based on the channel related information may comprise:

acquiring, based on the channel related information, at least one of channel quality indication (CQI) information, reference signal receiving power (RSRP) information and reference signal receiving quality (RSRQ) information of the target UE; and predicting, by the first AI network, the long-term SINR corresponding to the target UE based on at least one of the CQI information, the RSRP information and the RSRQ information.

In an example embodiment, the second AI prediction network may be or include a support vector regression (SVR) network or a long short-term memory (LSTM) network.

In an example embodiment, the channel related information may include at least one of the following:

the CQI information;
the RSRP information;
the RSRQ information;
decoding feedback information fed back by the target UE;
position information of the target UE; and
movement speed information of the target UE.

In an example embodiment, before acquiring the MCS related information corresponding to the target UE, the method may comprise:

determining the target UE to be an edge UE, when it is determined to perform resource scheduling on the target UE.

In an example embodiment, the determining the target UE to be an edge UE may comprise:

determining the target UE to be an edge UE based on at least one of the RSRP, RSRQ, SINR and/or position information corresponding to the target UE. For example, UEs in the cell may be divided in to two types (e.g., first type, second type) based on distance from cell boundary. In one example, the first type may be the edge UE and the second type UE may be the center UE.

In an example embodiment, the acquiring MCS related information corresponding to the target UE may comprise:

transmitting the acquired channel related information of the target UE to another network node, and determining, by the another network node and through an AI network, MCS related information corresponding to the target UE based on the channel related information; and receiving the MCS related information corresponding to the target UE transmitted by the another network node.

In an example embodiment, the acquiring MCS related information corresponding to the target UE may comprise:

transmitting the acquired channel related information of the target UE to another network node, determining, by the another network node and through an AI network, the MCS related information corresponding to the target UE based on the channel related information, and determining an MCS corresponding to the target UE based on the MCS related information; and receiving the MCS corresponding to the target UE transmitted by the another network node.

In an example embodiment, the another network node may be or comprise an RAN intelligent controller (RIC).

In the second aspect, an example embodiment may provide a method executed by a network node, comprising:

acquiring channel related information of a target user equipment (UE);

acquiring, by an AI network, MCS related information corresponding to the target UE based on the channel related information; and transmitting the MCS related information to a base station, and determining, by the base station, an MCS of the target UE based on the MCS related information, or transmitting, to the base station, an MCS of the target UE determined based on the MCS related information;

wherein the target UE includes an edge UE, and the number of MCS change value of the edge UE is greater than the number of MCS change value of a center UE.

In an example embodiment, the another network node may be or comprise an RAN intelligent controller (RIC).

In a third aspect, an example embodiment may provide a base station, comprising a memory and at least one processor comprising processing circuitry, wherein the memory has computer programs stored thereon; and wherein the processor may be configured to execute the computer programs to implement the method provided in the embodiment of the first aspect or any optional embodiment of the first aspect.

In a fourth aspect, an example embodiment may provide a network node, comprising a memory and a processor;

the memory has computer programs stored thereon; and
the processor may be configured to execute the computer programs to implement the method provided in the embodiment of the second aspect or any optional embodiment of the second aspect.

In a fifth aspect, an example embodiment may provide a computer-readable storage medium having computer programs stored thereon that, when executed by a processor, may implement the method(s) provided in the embodiment of the first aspect, any optional embodiment of the first aspect, the embodiment of the second aspect or any optional embodiment of the second aspect.

The technical solutions may have one or more of the following beneficial effects.

The corresponding MCS related information is acquired by an AI network based on the channel related information of the target UE, and the MCS of the target UE is then determined by using the acquired MCS related information. Since the MCS related information acquired by the AI network can accurately reflect the channel state of the target UE, the determined MCS is more accurate, and the user throughput is thus improved.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is the second BLER table of a high-speed edge target UE in an example according to an example embodiment;

FIG. 12 is a table of the number of effective decoding feedbacks of the high-speed edge target UE in an example according to an example embodiment;

FIG. 14a is typical values of the weight of the short-term SINR offset in various scenarios in an example according to an example embodiment;

The same reference numerals are used to represent the same elements throughout the drawings.

DETAILED DESCRIPTION

Figure 1:
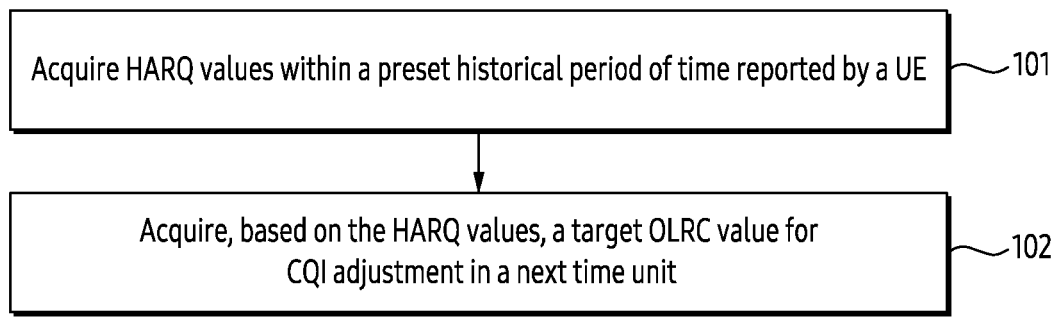
FIG. 1 is a flowchart of an outer loop rate control (OLRC) method according to an example embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. When a component is said to be "connected" or "coupled" to the other component, the component can be directly connected or coupled to the other component, or it can mean that the component and the other component are connected through at least one intermediate element(s). In addition, "connected" or "coupled" as used herein may include wireless connection or wireless coupling.

The term "include" or "may include" refers to the existence of a corresponding disclosed function, operation or component which can be used in various embodiments of the present disclosure and does not limit one or more additional functions, operations, or features. In addition, the terms "include" or "have" may be construed to denote a certain characteristics, numbers, steps, operations, constituent elements, components or a combination thereof, but may not be construed to exclude the existence possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B. When describing multiple (two or more) items, if the relationship between multiple items is not explicitly limited, the multiple items can refer to one, many or all of the multiple items. For example, the description of "parameter A includes A1, A2 and A3" can be realized as parameter A includes A1 or A2 or A3, and it can also be realized as parameter A includes at least two of the three parameters A1, A2 and A3.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

At least some of the functions in the apparatus or electronic device provided in the embodiments of the present disclosure may be implemented by an AI model. For example, at least one of a plurality of modules of the apparatus or electronic device may be implemented through the AI model. The functions associated with the AI can be performed through a non-volatile memory, a volatile memory, and a processor.

The processor may include one or more processors. At this time, the one or more processors may be general-purpose processors such as a central processing unit (CPU), an application processor (AP), etc., or a pure graphics processing unit, such as a graphics processing unit (GPU), a visual processing unit (VPU), and/or an AI specialized processor, such as a neural processing unit (NPU). Of course, each processor herein comprises processing circuitry.

The one or more processors control the processing of input data according to predefined operating rules or artificial intelligence (AI) models stored in the non-volatile memory and the volatile memory. The predefined operating rules or AI models are provided by training or learning.

Here, providing, by learning, refers to obtaining the predefined operating rules or AI models having a desired characteristic by applying a learning algorithm to a plurality of learning data. The learning may be performed in the apparatus or electronic device itself in which the AI according to the embodiments is performed, and/or may be implemented by a separate server/system.

The AI models may include a plurality of neural network layers. Each layer has a plurality of weight values. Each layer performs the neural network computation by computation between the input data of that layer (e.g., the computation results of the previous layer and/or the input data of the AI models) and the plurality of weight values of the current layer. Examples of neural networks include, but are not limited to, a convolutional neural network (CNN), a deep neural network (DNN), a recurrent neural network (RNN), a restricted Boltzmann machine (RBM), a deep belief network (DBN), a bi-directional recurrent deep neural network (BRDNN), generative adversarial networks (GANs), and deep Q-networks.

The learning algorithm is a method of training a predetermined target apparatus (e. g., a robot) by using a plurality of learning data to enable, allow, or control the target apparatus to make a determination or prediction. Examples of the learning algorithm include, but are not limited to, supervised learning, unsupervised learning, semi-supervised learning, or reinforcement learning.

Methods provided by the present disclosure may relate to one or more of the technical fields of speech, language, image, video, or data intelligence, and so on.

Optionally, when relating to the speech or language field, according to the present disclosure, a method for recognizing user speech and interpreting user intent in methods performed by an electronic device may receive a speech signal as an analog signal via a speech signal acquisition device (e.g., a microphone) and convert the speech signal to a computer readable text by using an automatic speech recognition (ASR) model. The user's utterance intent may be obtained by interpreting the converted text by using a natural language understanding (NLU) model. The ASR model or NLU model may be an artificial intelligence model. The artificial intelligence model may be processed by an artificial intelligence special-purpose processor designed in a hardware structure specified for the artificial intelligence model. The artificial intelligence model may be obtained by training. Here, "obtained by training" indicates training a basic artificial intelligence model with a plurality of training data through a training algorithm to obtain predefined operating rules or artificial intelligence models that are configured to perform the desired features (or purposes). Language understanding is a technology used to recognize and apply/process human language/text, including for example natural language processing, machine translation, dialogue systems, question and answer, or speech recognition/synthesis.

Optionally, when relating to the image or video field, according to the present disclosure, the method for recognizing objects in methods performed by an electronic device may obtain output data for identifying images or image features in the images by using image data as input data for an artificial intelligence model. The artificial intelligence model may be obtained by training. Here, "obtained by training" indicates that the basic artificial intelligence model is trained with a plurality of training data by a training algorithm to obtain predefined operational rules or artificial intelligence models that are configured to perform the desired features (or purposes). The methods of the present disclosure may relate to the field of visual understanding of artificial intelligence techniques, which is a technique for recognizing and processing things like human vision and includes, for example, object recognition, object tracking, image retrieval, human recognition, scene recognition, 3D reconstruction/localization, or image enhancement.

Optionally, when relating to the field of intelligent processing of data, according to the present disclosure, the method for reasoning about or predicting object categories in methods performed by an electronic device may use artificial intelligence models to recommend/perform category recognition results by using feature data. The processor of the electronic device may perform pre-processing operations on the data to convert it into a form suitable for as input to an artificial intelligence model. The artificial intelligence model can be obtained through training. Here, "obtained by training" indicates that the basic AI model is trained with multiple training data by a training algorithm to obtain predefined operational rules or AI models that are configured to perform the desired features (or purposes). Reasoning prediction is the technique of logical reasoning and prediction by determining information, including, for example, knowledge-based reasoning, optimal prediction, preference-based planning, or recommendation.

Embodiment 1

In the scheme of channel tracking by using the long-term historical report information and the fixed adjustment step, the channel quality indicator (CQI) value at the next moment is first predicted by long-period averaging, and the outer loop rate control (OLRC) adjustment value for CQI compensation at the next moment is then determined according to the current hybrid automatic retransmission request (HARQ) reported by the UE. Specifically, during the determination of the OLRC compensation value, the OLRC value at the previous adjustment moment is increased or decreased by a fixed step. However, the OLRC compensation value determined by increasing or decreasing the fixed step cannot satisfy the differentiated requirements of different scenarios. Meanwhile, in order to satisfy all users' requirements, a conservative compensation mode will be adopted, resulting in slow convergence of channel compensation. In a scenario of rapid channel change, the compensation cannot keep pace with the change of the channel. In view of the above problems, the embodiments of the present disclosure provide an outer loop rate control method.

In wireless communication system, UE's channel quality changes rapidly over time. Link adaption solution selects appropriate MCS according to the predicted real-time channel quality. MCS determines the data rate for UE. Higher MCS can achieve higher data rate but it requires better channel quality. Link adaptation is a key technology for wireless communication system, and always a big challenge for better performance. AI based link adaptation has attracted wide attention in the industry, and it is an inevitable trend in the future.

Conventional link adaptation is a conservative method based on long-term SINR and SINR offset. CQI and ACK/NACK information are used to obtain MCS. The CQI is periodically reported by UE and reflects long-term SINR caused by the average channel quality. The ACK/NACK information is UE decoding correct or incorrect information, which reported by UE, reflects whether current SINR matches real-time channel quality. The ACK/NACK information is used to update SINR offset in next time based on fixed OffsetUp/OffsetDown.

The output of the link adaptation is the selected MCS for UE. The MCS is mapped to real-time SINR.

Conventional link adaptation method leads to low throughput. In practical scenarios, it is a common phenomenon that channel quality changes rapidly in 5G/B5G system due to higher frequency, large bandwidth, and ultra dense networks. Conventional link adaptation can only adapt to very slow changes of channel quality. Conventional link adaptation cannot adapt to rapid changes of channel quality due to the following two problems, so the selected MCS cannot match the real-time channel quality which leads to low throughput. For example, the edge UE is easily interfered by neighbor cell, so needs large SINR offset to adapt to fast channel quality changes. The center UE is far from neighbor cell, needs small SINR offset to adapt to slow channel quality changes. For each UE, large SINR offset is needed when UE is moving, small SINR offset is needed when UE is still. To overcome the problems (e.g., low throughput in the edge UE), the present disclosure provides to obtain MCS based on real-time SINR using AI model.

FIG. 1 is a flowchart of an outer loop rate control method according to an embodiment of the present disclosure. The executive body of the method may be a base station. As shown in FIG. 1, the method may include the following steps.

In operation 101, HARQ values within a preset historical period of time reported by a UE are acquired.

The preset historical period of time is a period of time between the current moment and a previous historical moment. Within this preset historical period of time, the base station acquires the HARQ values reported by the UE. The length of the preset historical period of time may be determined according to the size of the required data.

In operation 102, a target OLRC value for CQI adjustment in a next time unit is acquired based on the HARQ values.

Specifically, after acquiring the HARQ values within the preset historical period of time, the base station processes these HARQ values to obtain the target OLRC value for CQI adjustment in the next time unit. Specifically, it is possible that the current HARQ value within the preset historical period of time is analyzed and processed to determine the target OLRC value; or, it is also possible that the historical HARQ values within the preset historical period of time are analyzed and processed to determine the target OLRC value. How to determine the target OLRC value will be described below in details.

In the scheme provided by the present disclosure, the HARQ values within the preset historical period of time reported by the UE are analyzed and processed to determine the target OLRC value for CQI adjustment in the next time unit. Since the target OLRC value is determined based on the HARQ values within the preset historical period of time in this scheme, CQI adjustment requirements in the scenario of rapid channel can be satisfied, so that the base station can select a more appropriate MCS and the throughput of the user can be improved.

In an embodiment of the present disclosure, there may be two ways of determining, based on the HARQ values, the target OLRC value for CQI adjustment in the next time. The first way is a scheme based on the adjustment at a fixed step. That is, the target OLRC value is obtained by increasing or decreasing the fixed step on the basis of the current OLRC value. The second way is based on the analysis and processing of all HARQ values within the preset historical period of time, and the target OLRC value is acquired based on the result of processing and analysis. In practical applications, the corresponding triggering conditions can be set for the two schemes. Specifically, it is necessary to first determine the neighboring cell interference of the cell where the UE is located, then determine the channel condition of the cell where the user is located, and determine to adopt which scheme of acquiring the target OLRC value based on the two results of determination.

Figure 2:
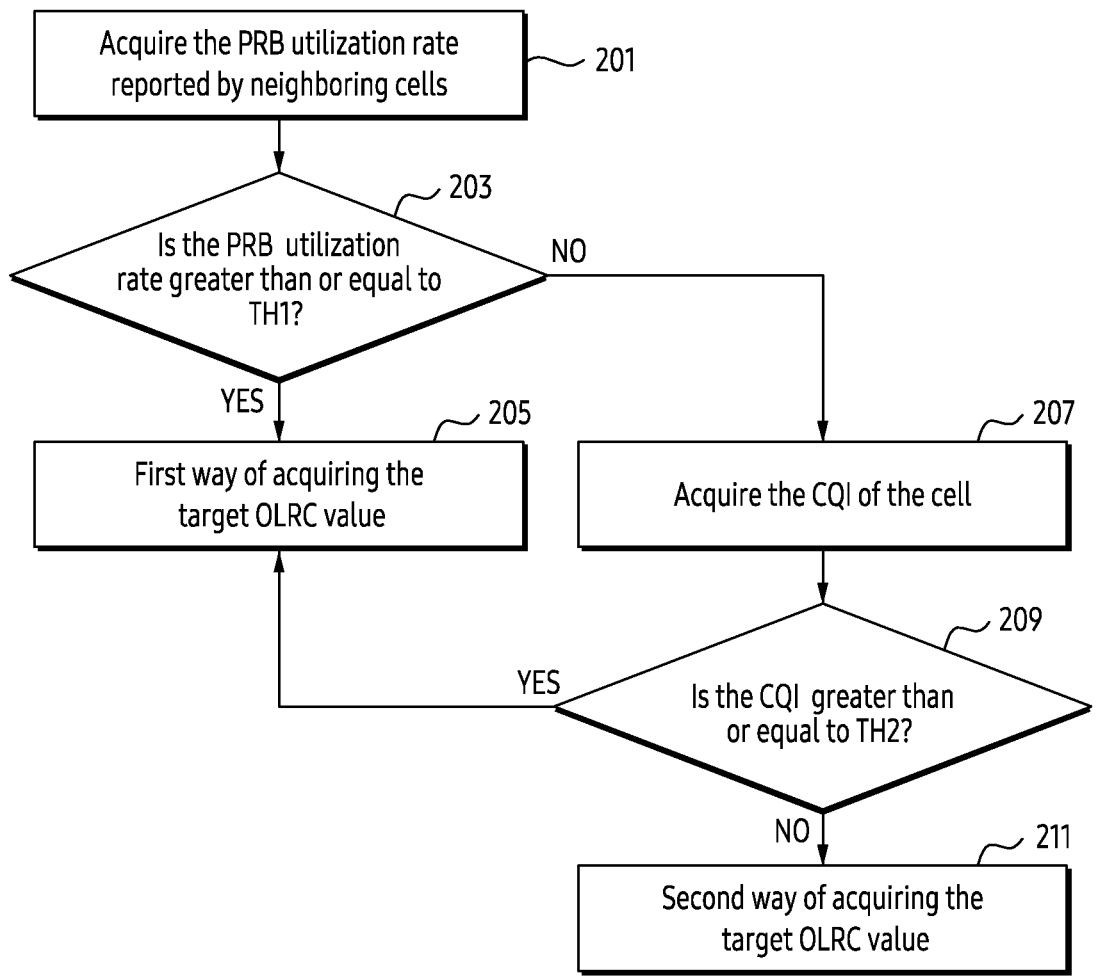
FIG. 2 is a flowchart of determining a target OLRC mode in an example according to an embodiment of the present disclosure.

FIG. 2 is a flowchart of determining a target OLRC mode in an example according to an embodiment of the present disclosure. The operations described in FIG. 2 may be performed by a network device (e.g., base station, DU, and/or RU).

As shown in FIG. 2, the interference change situation of the user depends on the utilization rate of physical resource blocks (PRBs) in neighboring cells. In operation 201, the network device may acquire the PRB utilization rate reported by the neighboring cells.

In operation 203, the network device identifies whether the PRB utilization rate is greater than or equal to the first preset threshold (which may be denoted by TH1) or not. If the utilization rate of resources in neighboring cells is higher, the interference change of neighboring cells is smaller. In extreme cases, the utilization rate of resources in neighboring cells is 100%. In this case, the interference of neighboring cells remains unchanged. If the utilization rate of resources in neighboring cells is greater than the first preset threshold (which may be denoted by TH1), e.g., 60%, it indicates that the interference change of neighboring cells is small, and the target OLRC value may be determined in the first way. In case that the PRB utilization rate is greater than or equal to TH1, the network device may perform the operation 205. In operation 205, the network device may use the first way of acquiring the target OLRC Value. In case that the PRB utilization rate is smaller than TH1, the network device may perform the operation 207.

If the utilization rate of resources in neighboring cells is not greater than the first preset threshold, the channel condition of the cell where the UE is located is to be determined continuously.

In operation 207, the network device may acquire the CQI of the cell. In operation 209, the network device may identify whether the CQI is greater than or equal to than the second threshold (which may be denoted by TH2) or not. In case that the CQI is greater than or equal to TH2, the network device may perform the operation 205. In case that the CQI is smaller than TH2, the network device may perform the operation 211.

If the user is in the center of the cell, the channel condition is good even if there is interference from neighboring cells, and the user can still perform transmission at the highest rate. That is, the CQI value reported by the UE is not less than the second threshold (which may be denoted by TH2). Since the channel condition of the cell where the UE is located is good, the target OLRC value can still be determined in the first way. If the CQI value reported by the UE is less than the second preset threshold, in order to obtain the more accurate target OLRC value, the target OLRC value may be determined in the second way.

It is to be noted that, on the premise of not performing the above two determinations, in order to ensure the accuracy of the target OLRC value, the target OLRC value may also be directly determined in the second way. The specific implementation process of the two ways will be described below in details.

In an embodiment of the present disclosure, if the utilization rate of resources in neighboring cells of the cell where the UE is located is not greater than the first preset threshold and the CQI value of the cell where the UE is located is not greater than the second preset threshold, the acquiring, based on the HARQ values, the target OLRC value for CQI adjustment in the next time unit comprises:

acquiring, based on the HARQ values, BLER values corresponding to at least two different preset OLRC values in at least two different preset periods within the preset historical period of time; and acquiring the target OLRC value based on the BLER values corresponding to different present OLRC values in different preset periods.

It should be understood that the way of acquiring the target OLRC is the second way described above.

Specifically, a plurality of preset periods are first determined from the preset historical period of time, and each preset period may include one or more transmission time intervals (TTIs). Specifically, if it is assumed that the preset historical period of time contains 400 TTIs, from which 8 preset periods may be determined, which contain 10, 20, 30, 40, 50, 100, 200 and 400 TTIs, respectively, and the TTIs in each preset period of time are the corresponding number of TTIs from the last TTI in the preset historical period of time. For example, if the TTIs in the preset historical period of time are numbered as 1, 2, 3, . . . , 400 in a chronological order, the serial numbers of the TTIs in the preset period containing 10 TTIs are 391, 392, . . . , 400, and the serial numbers of the TTIs in the preset period containing 400 TTIs are 1, 2, 3, . . . , 400. It should be understood that the preset periods should be set to include longer periods and shorter periods.

Further, after a plurality of preset periods are determined, the preset HARQ values in each preset period are counted, analyzed and processed, respectively, to obtain the BLER value corresponding to each preset OLRC value. In an embodiment of the present disclosure, one or more preset OLRC values may be configured. For example, if 36 OLRC values (e.g., −17 to 18 dB) may be configured, each preset period will eventually contain the BLER values of 36 preset OLRC values. Then, based on the BLER value corresponding to different preset OLRC values in each preset period, the target OLRC value is determined from the plurality of preset OLRC values.

In an embodiment of the present disclosure, the acquiring, based on the HARQ values, BLER values corresponding to at least two different preset OLRC values in at least two different preset periods within the preset historical period of time comprises:

for each preset period, updating, based on the HARQ value corresponding to each preset OLRC value in this preset period, HARQ values corresponding to other preset OLRC values; and for each preset period, determining, based on the initial HARQ value and the updated HARQ value corresponding to each preset OLRC value, the BLER value corresponding to the preset OLRC value in this preset period.

Specifically, when the HARQ values in each preset period are processed, all HARQ values contained in this preset period are acquired first, where each HARQ values corresponds to one preset OLRC value. Then, for the specific value of each HARQ value and the relationship of size between the specific preset OLRC value of each HARQ value and other preset OLRC values, other preset OLRC values are determined to update the HARQ values. This process may be called "updating the HARQ values corresponding to other preset OLRC values". For example, if three HARQ values (e.g., negative acknowledgement (NACK), acknowledgement (ACK) and NACK) are totally received in a certain preset period, and the corresponding preset OLRC values are X, Y and Z, respectively (there are totally 36 preset OLRC values), the HARQ values corresponding to other 35 preset OLRC values are updated based on the HARQ value NACK corresponding to X and the relationship of size between X and other preset OLRC values.

Further, for each preset period, after the above updating process is completed, each preset OLRC value corresponds to one initial HARQ value (which may be set as 0) and one or more updated HARQ values. Then, the initial HARQ value and the updated HARQ value corresponding to each preset OLRC in each preset period are statistically analyzed, so that the BLER value corresponding to each preset OLRC value in each preset period can be obtained.

In an embodiment of the present disclosure, for each preset period, the updating, based on the HARQ value corresponding to each preset OLRC value in this preset period, HARQ values corresponding to other preset OLRC values comprises:

for any preset OLRC value in each preset period, if the HARQ value corresponding to the any preset OLRC value is NACK, determining the updated HARQ value of the preset OLRC value not less than the any preset OLRC value as NACK, and not updating the HARQ value corresponding to the preset OLRC value less than the any preset OLRC value; and if the HARQ value corresponding to the any preset OLRC value is ACK, not updating the HARQ values corresponding to other preset OLRC values.

Specifically, in any preset period, the HARQ values corresponding to other preset OLRC values are updated by using each HARQ value, that is, the HARQ values corresponding to other preset OLRC values are updated by using the HARQ value corresponding to each preset OLRC value in this preset period. Other preset OLRC values may be updated by using only the preset OLRC values having HARQ values of NACK in this preset period, and the preset OLRC values having HARQ values of ACK may not be updated. Specifically, for any preset OLRC value in this preset period, if the HARQ value corresponding to the any preset OLRC value is NACK, the updated HARQ value of the preset OLRC value not less than the any preset OLRC value is determined as NACK, and the HARQ value corresponding to the preset OLRC value less than the any preset OLRC value is not updated.

In an embodiment of the present disclosure, the determining, based on the initial HARQ value and the updated HARQ value corresponding to each preset OLRC value, the BLER value corresponding to the preset OLRC value in this preset period comprises:

for each preset OLRC value in each preset period, using the proportion of the total number of NACK in the initial HARQ value and the updated HARQ value corresponding to this preset OLRC value in the total number of HARQ feedbacks in this preset period as the BLER value.

The total number of HARQ feedbacks in this preset period is the total number of HARQs reported by the UE in this preset period.

Specifically, in the above updating process, the number of NACK corresponding to each OLRC value is accumulated every updating. After the updating in each period is completed, the total number of NACKs corresponding to each OLRC value in all OLRC values (e.g., the accumulated number of NACKs) is counted, and the proportion of the total number of NACKs in the total number of HARQ feedbacks in this preset period is used as the BLER value. For example, if the total number of HARQ feedbacks in a certain preset period is 10 and the total number of NACKs corresponding to a certain preset OLRC value after the updating is 5, the BLER value corresponding to this preset OLRC value in this preset period is 0.5.

In an embodiment of the present disclosure, the acquiring the target OLRC value based on the BLER values corresponding to different present OLRC values in different preset periods comprises:

determining, based on the BLER value corresponding to each OLRC value in each preset period and from each preset OLRC value, a candidate OLRC value corresponding to the preset period; and determining the target OLRC value from the candidate OLRC value corresponding to each preset period.

Specifically, a corresponding BLER table is acquired based on the BLER values corresponding to different preset OLRC values in different preset periods, where each row of the BLER table is the BLER value corresponding to the corresponding preset period in each preset period, and each column of the BLER table is the BLER value corresponding to each preset OLRC in the corresponding preset period. Based on the relationship of size between BLER values in each column of the BLER table, the candidate OLRC value corresponding to this column is obtained; and, based on the change in size between candidate OLRC values corresponding to each column, the target OLRC value is determined from the candidate OLRC values corresponding to each column.

After the BLER values corresponding to different preset OLRC values in different preset periods are determined, the content is stored in the form of table to obtain a corresponding BLER table (BT), or stored in the form of matrix to obtain a corresponding BLER MCS matrix (BMM). Each row of the BT or BMM is the BLER value corresponding to the corresponding preset OLRC value in each preset period, and each column is the BLER value corresponding to each preset OLRC in the corresponding preset period. It should be understood that the rows and columns in the BT or BMM may be interchanged. That is, each column is the BLER value corresponding to the corresponding preset OLRC value in each preset period, and each row is the BLER value corresponding to each OLRC in the corresponding preset period.

In an embodiment of the present disclosure, the determining, based on the BLER value corresponding to each OLRC value in each preset period and from each preset OLRC value, a candidate OLRC value corresponding to the preset period comprises:

determining, based on the relationship of size between the BLER value corresponding to each OLRC value in each preset period and the target BLER and from each preset OLRC value, the candidate OLRC value corresponding to the preset period.

Specifically, in order to ensure the transmission rate of the UE, a target BLER value (general 10%) will be set; and then, during the selection of the target OLRC value for CQI adjustment, the OLRC value corresponding to the BLER value that is not greater than and closest to the target BLER value is used as the OLRC value for CQI adjustment. Therefore, such an OLRC value can be selected for each preset period according to this principle, and this OLRC value can be called a candidate OLRC value.

In an embodiment of the present disclosure, the determining the target OLRC value from the candidate OLRC value corresponding to each preset period comprises:

acquiring the first channel change speed feature based on the change of the candidate OLRC value corresponding to each preset period; and determining, based on the first channel change speed feature, the target OLRC value from the candidate OLRC value corresponding to each preset period.

Specifically, after the candidate OLRC value corresponding to each preset period is determined, the final target OLRC value needs to be determined from these OLRC values. In this case, the channel change speed needs to be considered, and the channel change speed feature may be determined according to the change of the candidate OLRC value corresponding to each preset period. Specifically, if there is a great difference between the long preset period and the short preset period in the candidate OLRC value corresponding to each preset period, it may indicate that the channel changes rapidly; and, if there is a small difference between the long preset period and the short preset period in the candidate OLRC value corresponding to each preset period, it may indicate that the channel changes slowly.

When the first channel change speed feature indicates that the channel changes rapidly, the candidate OLRC value corresponding to the short preset period may be used as the target OLRC value; and, when the first channel change speed feature indicates that the channel changes slowly, the candidate OLRC value corresponding to the long preset period may be used as the target OLRC value.

In an embodiment of the present disclosure, the determining, based on the first channel change speed feature, the target OLRC value from the candidate OLRC value corresponding to each preset period comprises:

acquiring the CQI value reported by the UE in the current time unit, and acquiring, based on the HARQ value, an effective HARQ ratio (EHR) corresponding to each preset period; and determining, based on the first channel change speed feature, the CQI reported in the current time unit and the EHR corresponding to each preset period, the target OLRC value from the candidate OLRC value corresponding to each preset period.

The CQI value may reflect the interference from neighboring cells in the cell where the UE is located and further reflect the channel change speed feature.

In addition, since the data transmitted by different UEs is different, the number of effective HARQ feedbacks in different preset periods is also different. For example, some UEs transmit large data packets, so all effective HARQ feedbacks may be obtained in one preset period. Some users transmit small data packets, so the effective HARQ feedbacks obtained in different preset periods are different. That is, the EHR may reflect the effectiveness of HARQ data in the preset period.

Further, effective HARQ sequences (EHSs) corresponding to all preset periods may be acquired according to the EHR corresponding to each preset period. For example, if K preset periods are defined totally, the EHSs corresponding to the K preset periods may be construed as a K-dimensional array.

Specifically, the determining, based on the first channel change speed feature, the CQI reported in the current time unit and the EHR corresponding to each preset period, the target OLRC value from the candidate OLRC value corresponding to each preset period comprises:

acquiring the second channel change speed feature based on the CQI value reported in the current time unit;

acquiring a period effectiveness feature corresponding to each preset period based on the EHR corresponding to each preset period; and determining, based on the first channel change speed feature, the second channel change speed feature and the period effectiveness feature corresponding to each preset period, the target OLRC value from the candidate OLRC value corresponding to each preset period.

Specifically, based on the CQI value reported in the current time unit, the channel change speed feature is determined, that is, the second channel change speed feature is acquired. The effect of the channel change speed feature on OLRC selection has been described above and will not be repeated here. The period effectiveness feature corresponding to each preset period is acquired based on the EHR corresponding to each preset period. In order to ensure the accuracy of the target OLRC, the candidate OLRC value corresponding to a preset period with a larger EHR among the preset periods may be selected as the target OLRC value.

The target OLRC value may be selected from the candidate OLRC value corresponding to each preset period based on the first channel change speed feature and in combination with the second channel change speed feature and the period effectiveness feature corresponding to each preset period.

In an embodiment of the present disclosure, in the process of acquiring the target OLRC value, based on the introduction of BT, the channel change speed (the first channel change speed feature and the second channel change speed feature) and the proportion of effective HARQs in the preset period (the EHR corresponding to each preset period) are considered. The BT may be construed as being used for the probability of successful short-term and long-term transmission of each MCS level, and the EHR is used for representing the importance of different preset periods in the BT, so that the target OLRC value acquired based on the BT is more accurate. Meanwhile, in the scheme of differentially dynamically compensating the channel quality, the radical compensation mode restricted in different scenarios is used to improve the convergence speed.

Figure 3:
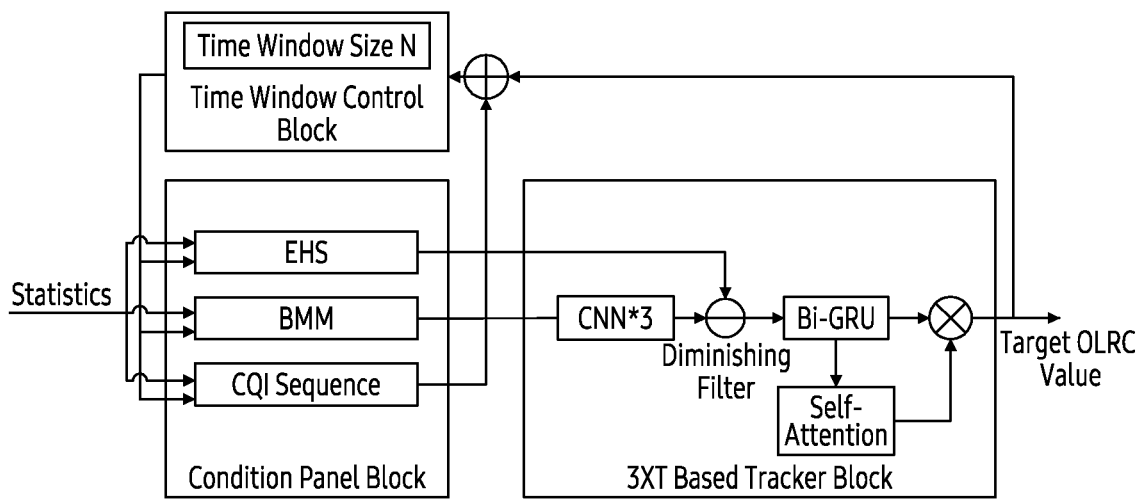
FIG. 3 is a schematic structure diagram of a preset AI model in an example according to an embodiment of the present disclosure.

FIG. 3 is a schematic structure diagram of a preset AI model in an example according to an embodiment of the present disclosure.

Further, in an embodiment of the present disclosure, the acquisition of the target OLRC value may be performed by the model 300 shown in FIG. 3. The model 300 may include a data processing unit (or called a condition panel block) and a preset AI model (or called three crossing tones (3XT) based tracker block), where the output of the data processing unit is used as the input of the preset AI model.

After the statistics containing HARQ values and CQI values are input into the data processing module, the data processing unit obtains the BT and the EHR corresponding to each preset period (in other words, the corresponding BMM and the EHS are obtained). Then, the obtained BMM, EHS and CQI are used as the inputs of the preset AI model together.

The preset AI model may mainly include a convolutional neural network (CNN) module, a bidirectional gated recurrent neural network (Bi-GRU) module, and a self-attention module, which are connected sequentially. In addition, a diminishing filter may also be provided between the CNN module and the Bi-GRU module to prevent or reduce over-fitting. Specifically, the preset AI model has three modules to adapt to rapid or slow SINR offset change. The CNN module is configured to process two-dimensional data for feature extraction. The Bi-GRU module is configured to process a time sequence, so that a better performance exhibits on some small data sets and it is easy to implement. The self-attention module further highlights the key feature and improves the accuracy of interference prediction. In addition, the diminishing filter assists in preventing or reducing the over-fitting of EHS. Finally, the output of the preset AI model is the probability of using each candidate OLRC value as the target OLRC value. Generally, the candidate OLRC value corresponding to the maximum or a high probability may be selected as the target OLRC value.

It is to be noted that, in the process of training the preset AI model, a cross entropy loss function may be used, and the cross entropy loss function has good gradient and numerical stability. Specifically, the cross entropy loss function may be represented by:

$$\text{Loss} = \frac{1}{M}\sum_{i=1}^{M}[\log(y_i) * olrcOffset_i]$$

where Loss represents the loss value, M represents the number of candidate OLRC values output by the preset AI model (M is generally equal to the number of preset OLRC values), and $y_i$ represents the probability value of the $i^{th}$ candidate OLRC value $olrcOffset_i$ output by the preset AI model.

In addition, as described above, in an embodiment of the present disclosure, the inputs of the preset AI model may include the BMM, the EHS and the CQI sequence, and these inputs correspond to predefined preset periods, respectively. It is to be noted that, in an embodiment of the present disclosure, the number of preset periods to be defined for determination of the target OLRC values of different time units and the length of each preset period (e.g., the size of the time window) may be different.

Specifically, the model 300 may further include a window size control block. If it is assumed that the target OLRC values of a plurality of time units are acquired by this model 300, the window size control block may determine, according to the probability values corresponding to a plurality of candidate OLRC values corresponding to one or more time units and the currently acquired EHS, the number of preset periods to be predefined for subsequent acquisition of the target OLRC value and the length of each preset period (e.g., the number of included TTIs). For example, the acquisition of target OLRC values of m time units and n time units by the above model has been described in an embodiment of the present disclosure. If the corresponding EHS and the probability value of each candidate OLRC value output by the model 300 are acquired in the process, the number of preset periods to be predefined for subsequent acquisition of target OLRC values of s time units and the length of each preset period may be determined by the window size control block. For example, it may be {10, 20, 30, 40, 50, 100}.

Meanwhile, it should be understood that the number of preset periods to be predefined for subsequent acquisition of target OLRC values of s time units and the length of each preset period may be the same. For example, two or more adjacent time units may adopt the same number of preset periods, and the length of each preset period is the same.

The above model may be used for conventional DU entities or the RAN intelligent controller (RIC) entity in the open RAN (ORAN) system structure. For example, the RIC may be a near-real time (RT) RIC. For another example, the RIC may be non-RT RIC.

The process of acquiring the target OLRC value based on the preset AI model in an embodiment of the present disclosure will be further described below by an example.

Figure 4:
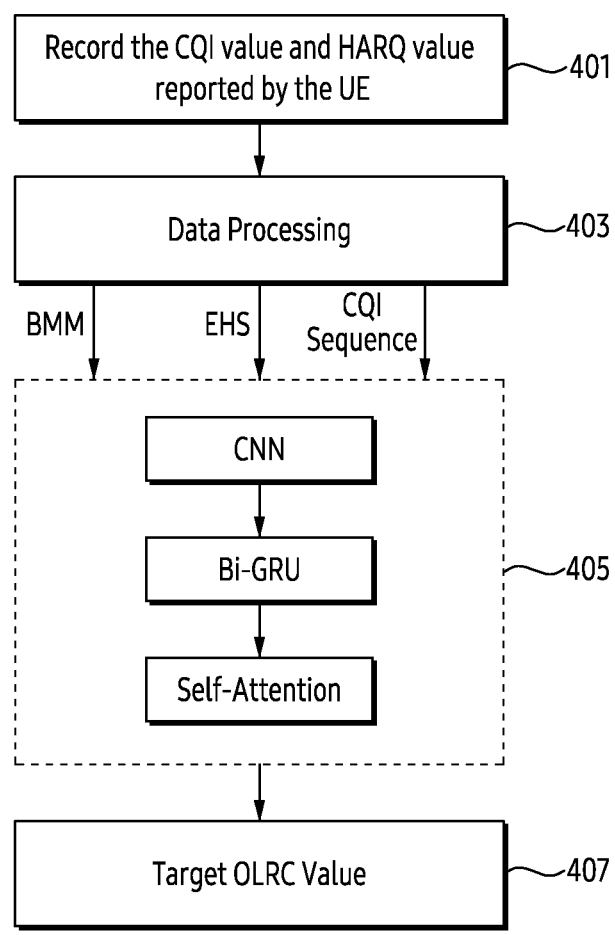
FIG. 4 is a schematic diagram of a process of acquiring a target OLRC value based on a preset AI model in an example according to an embodiment of the present disclosure.

FIG. 4 is a schematic diagram of a process of acquiring a target OLRC value based on a preset AI model in an example according to an embodiment of the present disclosure.

FIG. 4 shows a process of acquiring the target OLRC value based on the preset AI model in this example. This process 400 may include the following several steps.

The process 400 comprises recording the CQI value and the HARQ value reported by the UE. Next, the data processing unit preprocesses performs the data processing. (1) The data processing unit preprocesses the HARQ values within the preset historical period of time reported by the UE to obtain the corresponding BMM and EHS, and preprocesses the CQI value sequence (e.g., the sequence of CQI values corresponding to each preset period) reported by the UE to obtain the input of the preset AI model. The input may be denoted by X=(BMM$_{L\times K}$, EHS$_{1\times K}$, CQI$_{1\times K}$)=(x$_1$, x$_2$, . . . , x$_{L\times K+2K}$), where L is the number of preset OLRC values and K is the number of preset periods.

(2) The input obtained in the previous step is input into the preset AI model 405 and sequentially passes through the CNN module, the Bi-GRU module and the Self-Attention module in this model 405 to obtain a plurality of candidate OLRC values and their corresponding probabilities.

(3) The OLRC value corresponding to the maximum or a high probability is output as the target OLRC value 407.

In an embodiment of the present disclosure, if the utilization rate of resources in neighboring cells of the cell where the UE is located is greater than the first preset threshold and/or the CQI value of the cell where the UE is located is greater than the second preset threshold, the acquiring, based on the HARQ values, the target OLRC value for CQI adjustment comprises:

if the current HARQ value is ACK, adding the first fixed step to the current OLRC value to obtain the target OLRC value; and if the current HARQ value is NACK, subtracting the second fixed step from the current OLRC value to obtain the target OLRC value.

It should be understood that the way of acquiring the target OLRC is the first way described above.

Figure 5:
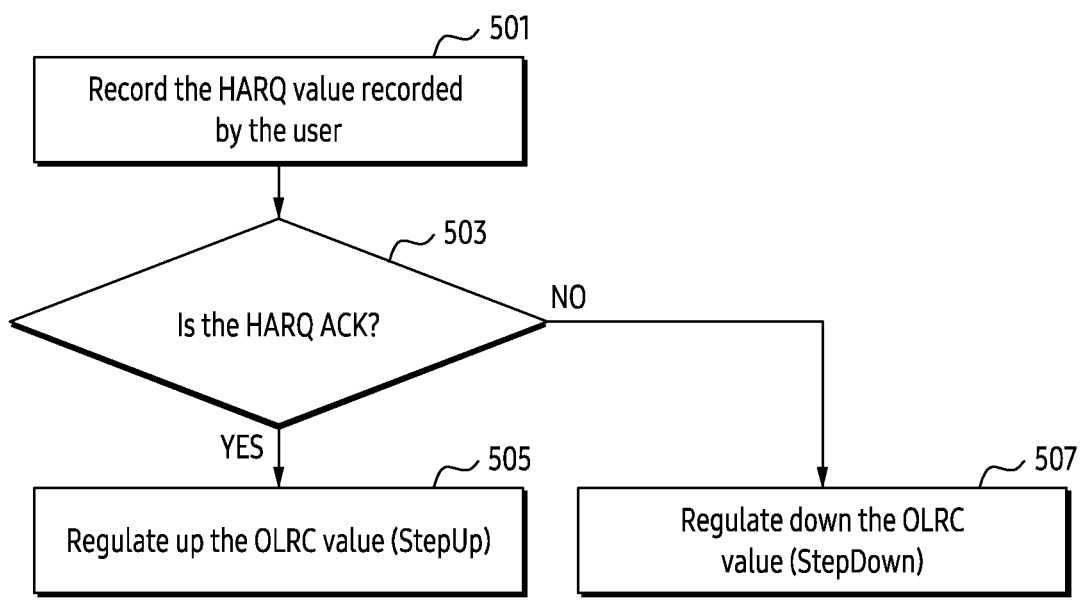
FIG. 5 is a flowchart of the first mode of acquiring a target OLRC mode in an example according to an embodiment of the present disclosure.

FIG. 5 is a flowchart of the first mode of acquiring a target OLRC mode in an example according to an embodiment of the present disclosure. The operations described in FIG. 5 may be performed by a network device (e.g., base station, DU, and/or RU).

Specifically, as shown in FIG. 5, in operation 501, the network device may perform record the HARQ value recorded by the user. In operation 503, the network device may identify whether the HARQ value is ACK or not. In case that the HARQ value is ACK, the network device may perform the operation 505. In operation 505, the network device may perform regulate up the OLRC Value. In other words, if the current HARQ value is ACK, the first fixed step (StepUp) is increased based on the current OLRC value to obtain the target OLRC value. In case that the HARQ value is ACK, the network device may perform the operation 507. In operation 507, the network device may perform regulate down the OLRC Value. If the current HARQ value is NACK, the second fixed step (StepDown) is decreased based on the current OLRC value to obtain the target OLRC value. And, if no ACK/NACK is received, the current OLRC value remains unchanged to obtain the target OLRC value. Specifically, it may be expressed as the following formula:

$$OLRC(t+1) = \begin{cases} OLRC(t) + StepUp, \text{ if } ACK \text{ is received} \\ OLRC(t) - StepDown, \text{ if } NACK \text{ is received} \\ OLRC(t), \text{ if no } ACK/NACK \text{ is received} \end{cases}$$

where OLRC(t+1) is the target OLRC value, and OLRC(t) is the current OLRC value.

Embodiment 2

Figure 6:
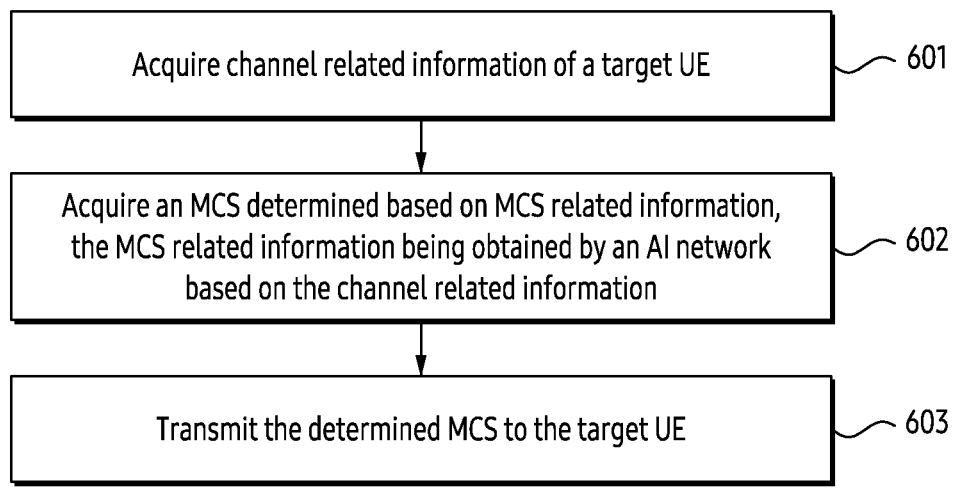
FIG. 6 is a flowchart of a method executed by a base station according to an example embodiment.

FIG. 6 is a flowchart of a method executed by a base station according to an example embodiment. As shown in FIG. 6, the method may include the following steps.

In operation 601, channel related information of a target user equipment (UE) is acquired.

The channel related information of the target UE may include one or more of channel quality indication (CQI) information, reference signal receiving power (RSRP) information, reference signal receiving quality (RSRQ) information, decoding feedback information, position information and movement speed information reported by the target UE. The decoding feedback information includes NACK and ACK.

In operation 602, a modulation and coding scheme (MCS) determined based on MCS related information is acquired, the MCS related information being obtained by an AI network based on the channel related information.

Specifically, in an example embodiment, the MCS related information may be acquired by the AI network. When the base station has sufficient computing power, the AI network may be deployed on the base station; and, when the base station has insufficient computing power, the AI network may be deployed on another network node. When the AI network is deployed on the another network node, the base station transmits the channel related information to this network node, and receives the MCS related information fed back by this network node and/or the MCS determined based on the MCS related information.

In operation 603, the determined MCS is transmitted to the target UE.

Specifically, the base station transmits the determined MCS to the target UE, and may transmit data for the target UE according to the determined MCS. The target UE decodes the received data according to the received MCS.

The target UE includes an edge UE, and the number of MCS change value of the edge UE is greater than the number of MCS change value of a center UE. Specifically, by using the scheme of the present disclosure, the difference in level between MCSs received by the UE from the base station for adjacent two times is counted to obtain a corresponding difference set, and the number of differences in the difference set corresponding to the edge UE is greater than the number of differences in the difference set corresponding to the center UE. The edge UE may be refereed as the first type UE and the center UE may be referred as the second type UE. The terms 'edge' and 'center' cannot be interpreted as limiting embodiments.

For the center UE in the cell, the change value (e.g., difference) between the levels of MCSs received for two adjacent times can only be 0, 1, or 2. When the level of the MCS is regulated up, the change value between the levels of MCSs received for two adjacent times can only be 0 or 1; and, when the level of the MCS is regulated down, the change value between the levels of MCSs received for two adjacent times can only be 0, 1 or 2. For the edge UE in the cell, since the real-time SINR value is calculated by the AI network, the real-time channel state of the UE can be reflected, so that the change value between the levels of MCSs received for two adjacent times is not limited to 0, 1 or 2 and may be more other values. If the channel state of the UE changes more rapidly, the change value between the levels of MCSs received for two adjacent times is larger. For example, if the movement speed of the UE is higher, the change value between the levels of MCSs received for two adjacent times is larger; or, if the UE is farther away from the center of the cell, the change value between the levels of MCSs received for two adjacent times is larger.

In addition, the UE may determine the position region of the UE by using a UE position report. If the distance from the UE to the base station is less than a certain threshold, the UE is considered to be located in the center of the cell, that is, the UE is a center UE; otherwise, the UE is located at the edge of the cell, that is, the UE is an edge UE. The base station may also determine the position region of the UE according to the RSRP or SINR (calculated from CQI). If the RSRQ or SINR is greater than a set threshold, the UE is considered to be located in the center of the cell; otherwise, the UE is located at the edge of the cell.

In the scheme provided by the present disclosure, the corresponding MCS related information is acquired by an AI network based on the channel related information of the target UE, and the MCS of the target UE is then determined by using the acquired MCS related information. Since the MCS related information acquired by the AI network can accurately reflect the channel state of the target UE, the determined MCS is more accurate, and the user throughput is thus improved.

Figure 7:
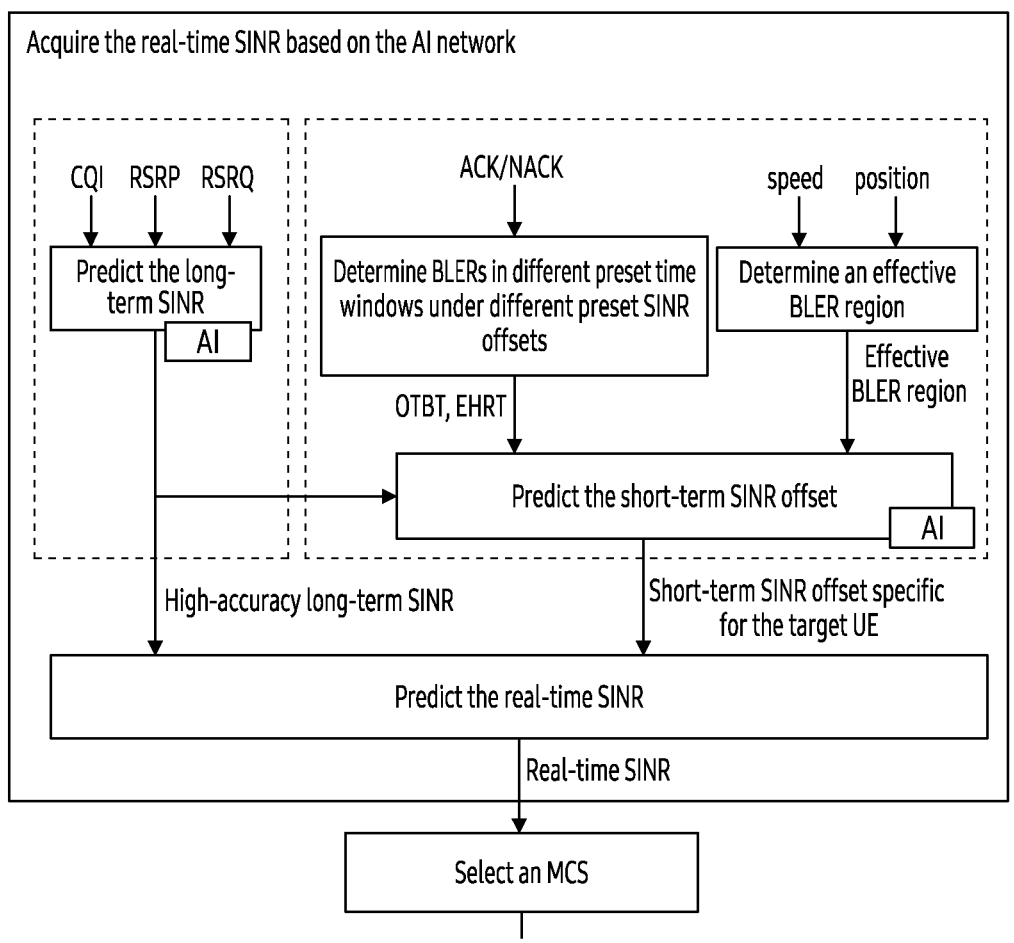
FIG. 7 is a schematic diagram of a process of determining an MCS of a target UE in an example according to an example embodiment.

FIG. 7 is a schematic diagram of a process of determining an MCS of a target UE in an example according to an example embodiment.

In the scheme 700 provided by the present disclosure, as shown in FIG. 7, in order to determine the MCS of the target UE, on one hand, the short-term SINR offset corresponding to the target UE needs to be determined; on the other hand, the long-term SINR corresponding to the target UE needs to the determined, the real-time SINR of the target UE is then determined based on the short-term SINR offset and the long-term SINR, and an appropriate MCS is finally selected based on the determined real-time SINR. The determination of both the short-term SINR offset and the long-term SINR may be implemented by the AI network, and the implementation process of the two aspects will be described below in details.

In an example embodiment, the acquiring an MCS determined based on MCS related information comprises:

predicting, by the first AI network, a short-term SINR offset corresponding to the target UE based on the channel related information;

acquiring the MCS related information corresponding to the target UE based on the short-term SINR offset; and determining an MCS corresponding to the target UE based on the determined MCS related information.

Specifically, the short-term SINR offset corresponding to the target UE may be predicted by the first AI network; then, the real-time corresponding MCS related information is determined based on the short-term SINR offset, where the MCS related information may be the real-time SINR; and finally, the MCS of the target UE is determined based on the real-time SINR.

In an example embodiment, the predicting, by the first AI network, a short-term SINR offset corresponding to the target UE based on the channel related information comprises:

acquiring first BLER information corresponding to the target UE based on a decoding feedback value fed back by the target UE, the first BLER information containing BLERs of different preset time windows under different preset SINR offsets; and predicting, by the first AI network, the short-term SINR offset corresponding to the target UE based on the first BLER information.

Each of the different preset time windows is different in length.

The base station may maintain a correspondence table between one decoding feedback value and SINR offsets (e.g., actual SINR offsets) for the target UE. Specifically, the base station may maintain a table of ACK/NACK feedbacks and actual SINR offsets received in the latest N time units (e.g., slots), where N is a natural number greater than 1 and may be selected according to actual needs.

Figure 8:
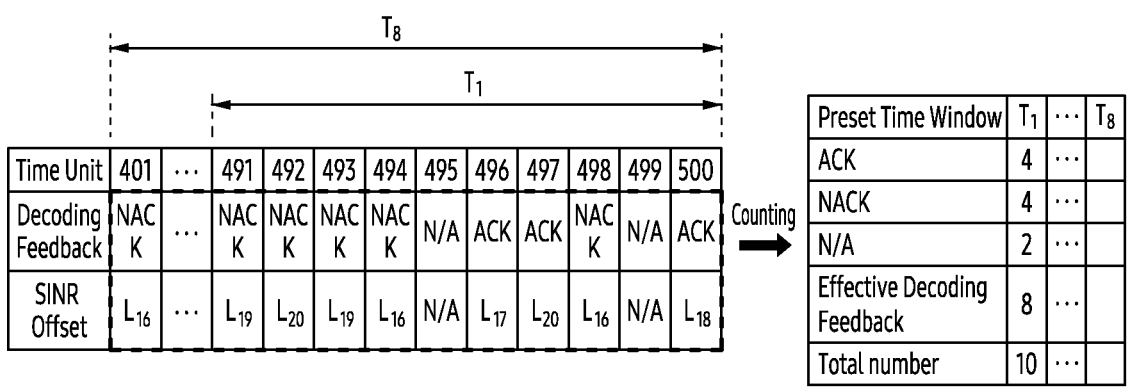
FIG. 8 is a correspondence table of decoding feedback values and SINR offsets in an example according to an example embodiment.

FIG. 8 is a correspondence table of decoding feedback values and SINR offsets in an example according to an example embodiment. For example, the correspondence table 800 of one target UE in time units 401 to 500 is shown in FIG. 8. According to the relation table on the left side of FIG. 8, the table on the right side can be obtained. This table shows the number of different decoding feedback values in each preset time window, the number of effective decoding feedbacks, and the total number of time units, which can be used to calculate the BLER and effective BLER subsequently. Thus, the decoding feedback value and actual SINR offset corresponding to the target UE in any time unit within the preset historical period of time can be obtained according to the correspondence table 800.

Specifically, a plurality of preset SINR offsets may be set in advance. In an actual scenario, the value range of the preset SINR offset is −17 dB to 18 dB. Considering that a too large value interval will affect the subsequent prediction accuracy and a too small value interval will increase the calculation complexity of the AI network, by comprehensively considering accuracy and complexity, in an example embodiment, 1 dB may be used as the value interval to obtain 36 preset SINR offsets (which may be denoted by $L_1$, $L_2$, $L_3$, . . . , $L_{36}$). A plurality of preset time windows may be set in advance. The plurality of preset time windows include a plurality of time windows that use the current time point as the end time and have different window lengths. In an actual scenario, by considering complexity and performance, 8 time windows of 10 ms, 20 ms, 30 ms, 40 ms, 50 ms, 100 ms, 200 ms and 400 ms may be set (which may be denoted by $T_1$, $T_2$, . . . , $T_8$).

Then, the decoding feedback value and the actual SINR offset of the target UE in any time unit within the preset historical period of time may be acquired according to the correspondence table 800, and BLERs of different preset time windows under different preset SINR offsets are acquired, that is, the corresponding first BLER information is acquired. The first BLER information may be represented in the form of table, e.g., the first BLER table (first BT, where the BT may be called an offset-time 2D BLER table (OTBT)).

In an example embodiment, the acquiring first BLER information corresponding to the target UE based on a decoding feedback value fed back by the target UE comprises:

acquiring an actual SINR offset corresponding to each time unit within a preset historical period of time and the decoding feedback value fed back by the target UE; and acquiring the first BLER information based on the actual SINR offset corresponding to each time unit within the preset historical period of time and the decoding feedback value fed back by the target UE.

Specifically, the acquiring the first BLER information based on the actual SINR offset corresponding to each time unit within the preset historical period of time and the decoding feedback value fed back by the target UE comprises:

for each preset time unit, determining, based on the actual SINR offset corresponding to the preset time unit and the decoding feedback value fed back by the UE, a decoding feedback value of the preset time unit under a preset SINR offset;

for each preset time window, acquiring, based on decoding feedback values of each preset time unit within the preset time window under different preset SINR offsets, BLERs of the preset time window under different preset SINR offsets; and acquiring the first BLER information based on the BLERs of each preset time window under different preset SINR offsets.

Specifically, for each preset time window, the number of NACKs fed back by the target UE is finite. To acquire the BLERs of each preset time window under different preset SINR offsets, expansion needs to be performed based on the finite decoding feedback values fed back by the target UE.

In an example embodiment, the determining, based on the actual SINR offset corresponding to the preset time unit and the decoding feedback value fed back by the UE, a decoding feedback value of the preset time unit under a preset SINR offset comprises:

if the decoding feedback value fed back by the UE corresponding to the preset time unit is ACK, determining the decoding feedback value of the preset time unit under the preset SINR offset as ACK; and if the decoding feedback value fed back by the UE corresponding to the preset time unit is NACK, determining the decoding feedback value of the preset time unit under a preset SINR offset greater than the actual SINR offset as NACK, and determining the decoding feedback value of the preset time unit under a preset SINR offset less than the actual SINR offset as ACK.

Specifically, for each preset time window, the decoding feedback value fed back by the target UE in each time unit and the corresponding actual SINR offset are determined. Then, in the expansion process, for each time unit, if the feedback from the target UE in this time unit is ACK, the decoding feedback values in this time unit under all preset SINR offsets are determined as ACK, that is, the NACK count in this time unit under all preset SINR offsets is 0; and, if the feedback from the target UE in this time unit is NACK, the decoding feedback values of the preset time unit under preset SINR offsets greater than the actual SINR offset are determined as NACK, and the decoding feedback values of the preset time unit under preset SINR offsets less than the actual SINR offset are determined as ACK. That is, the NACK count of this time unit under the actual SINR offset and all preset SINR offsets greater than the actual SINR offset is 1, respectively, and the NACK count under all SINR offsets less than the actual SINR offset is 0. If the target UE has no feedback (e.g., N/A) in this time unit, the NACK count of this time unit under all preset SINR offsets is 0. After the above expansion is completed, for each preset time window, the BLERs of this preset time window under different preset SINR offsets can be calculated by counting the NACK count and the number of included time units, so that the first BLER table is obtained.

The process of acquiring the first BLER table will be described below by an example. It is assumed that the preset time windows are $T_1, T_2, \ldots, T_8$, respectively, and the preset SINR offsets are $L_1, L_2, L_3, \ldots, L_{36}$, respectively. The correspondence table for the target UE is as shown in FIG. 8, and the decoding feedback value and the actual SINR offset of the target UE corresponding to any time unit within the preset historical period of time may be obtained according to this table. For example, in the time unit 494, the corresponding decoding feedback value is NACK, and the corresponding actual SINR offset is $L_{16}$.

Figure 9:
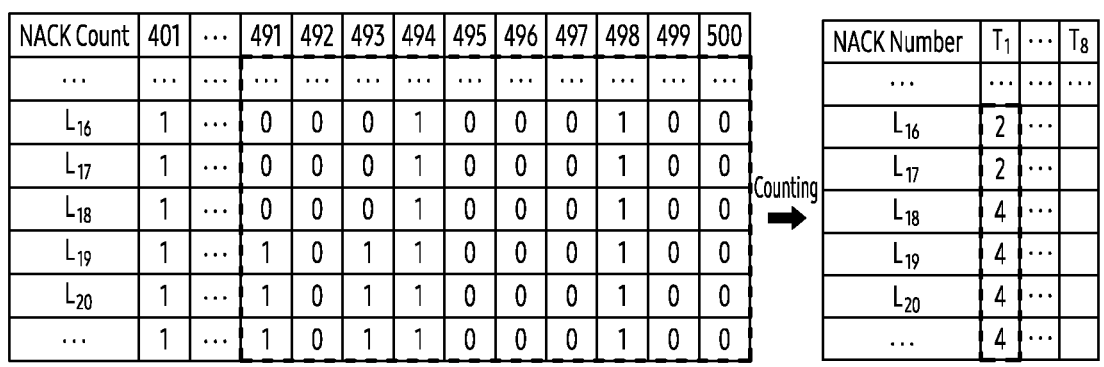
FIG. 9 is an expanded decoding feedback value table of each time unit under different preset SINR offsets in an example according to an example embodiment.

FIG. 9 is an expanded decoding feedback value table of each time unit under different preset SINR offsets in an example according to an example embodiment. The decoding feedback value table 900 of each time unit under different preset SINR offsets may be obtained by the above expansion method, as shown in FIG. 9. Specifically, for the time unit 491, the corresponding decoding feedback value is NACK, and the corresponding actual SINR offset is $L_{19}$. Thus, in accordance with the above expansion method, the decoding feedback values of the time unit 491 under $L_1$ to $L_{18}$ are ACK, and the decoding feedback values of the time unit 491 under $L_{19}$ to $L_{36}$ are NACK. To facilitate the calculation of the BLER, ACK is denoted by "0", and NACK is denoted by "1". For the time unit 492, the corresponding decoding feedback value is ACK, and the corresponding actual SINR offset is $L_{20}$. Thus, in accordance with the above expansion method, the decoding feedback values of the time unit 492 under $L_1$ to $L_{36}$ are ACK, which is denoted by "0". For the time unit 495, the target UE has no decoding feedback in this time unit, so the decoding feedback values of the time unit 495 under $L_1$ to $L_{36}$ are directly denoted by "0" in accordance with the above expansion method. Finally, based on the decoding feedback value table 900 obtained by expansion, the BLERs of each time window under different preset SINRs may be calculated, so that the first BLER table is obtained. For example, for the preset time window $T_1$ (the corresponding time units are 491 and 500), it can be obtained according to the decoding feedback table that the total number of NACK of the preset time window $T_1$ under $L_{16}$ is 2. By dividing the number of effective decoding feedbacks in the preset time window $T_1$ (e.g., 8) by the total number of NACK (e.g., 2), it is obtained that the BLER of the preset time window $T_1$ under $L_{16}$ is 0.25. FIG. 9 further gives the NACK number table according to the decoding feedback value table 900.

The NACK number table incudes the number of NACKs of different preset time windows under different preset SINR offsets.

In an example embodiment, the predicting, by the first AI network, the short-term SINR offset corresponding to the target UE based on the first BLER information comprises:
  acquiring the second BLER information based on a movement feature and/or position feature of the target UE and the first BLER information; and
  predicting, by the first AI network, the short-term SINR offset corresponding to the target UE based on the second BLER information.

The second BLER information includes the BLER of each effective preset time window under each effective preset SINR offset. The BLER may be identified in the form of table, e.g., the second BLER table. The second BLER table is determined from the first BLER table based on the movement feature and/or position feature of the target UE.

In an example embodiment, the acquiring second BLER information based on a movement feature and/or position feature of the target UE and the first BLER information comprises:
  selecting, based on the movement feature of the target UE, an effective preset time window from the preset time window contained in the first BLER information, and/or selecting, based on the position feature of the target UE, an effective preset SINR offset from the preset SINR offset of the first BLER information; and
  determining the second BLER information based on the effective preset time window and/or the effective preset SINR offset.

Specifically, the determining the second BLER information based on the effective preset time window and/or the effective preset SINR offset comprises:
  setting BLERs other than the BLER corresponding to the effective preset time window and/or the effective preset SINR offset in the first BLER information as zero to obtain the second BLER information.

Specifically, the effective preset time window may be selected according to the movement feature of the target UE. When the movement speed of the target UE is relatively high, the channel state changes rapidly, and the BLER of the target UE in a long preset time window cannot accurately reflect the rapid change of the channel state. Therefore, the BLER in a shorter preset time window may be selected as the effective BLER. On the contrary, when the movement speed of the target UE is relatively low, the BLER in a longer preset time window may be selected as the effective BLER. For example, when the above way of dividing preset time windows is adopted, and when the target UE is a high-speed user (>=30 km/h), short preset time windows $T_1$, $T_2$, $T_3$ and $T_4$ are selected for the user; when the target UE is a medium-speed user (>3 km/h and <30 km/h), preset time windows $T_3$, $T_4$, $T_5$ and $T_6$ with a moderate length may be selected; and, when the target UE is a low-speed user (<=3 km/h), long preset time windows $T_5$, $T_6$, $T_7$ and $T_8$ are selected for the user.

The effective preset SINR offset may be selected according to the position feature of the UE in the cell. When the target UE is located at the edge of the UE, the change value of the channel state is relatively large, and the BLER under a small range of preset SINR offsets cannot accurately reflect the change of the channel state. Therefore, the BLER under a large range of preset SINR offsets may be selected as the effective BLER. On the contrary, when the target UE is located in the center of the cell, the BLER under a small range of preset SINR offsets may be selected as the effective BLER. For example, by adopting the above way of setting preset SINR offsets, when the target UE belongs to an edge user, the full set L set1: $\{L_1, \ldots, L_{36}\}$ of preset SINR offsets is selected as effective preset SINR offsets for the user; and, when the target UE belongs to a center user, a subset L set2: $\{L_{13}, \ldots, L_{24}\}$ of preset SINR offsets is selected as effective preset SINR offsets for the user.

It should be understood that the BLERs in the effective preset time windows and/or corresponding to the effective preset SINR offsets are BLERs in the second BLER table, and the BLERs in the second BLER table may also be called effective BLERs. In an actual scenario, the second BLER table may be obtained by setting BLERs other than the effective BLER in the first BLER table as zero.

Figure 10:
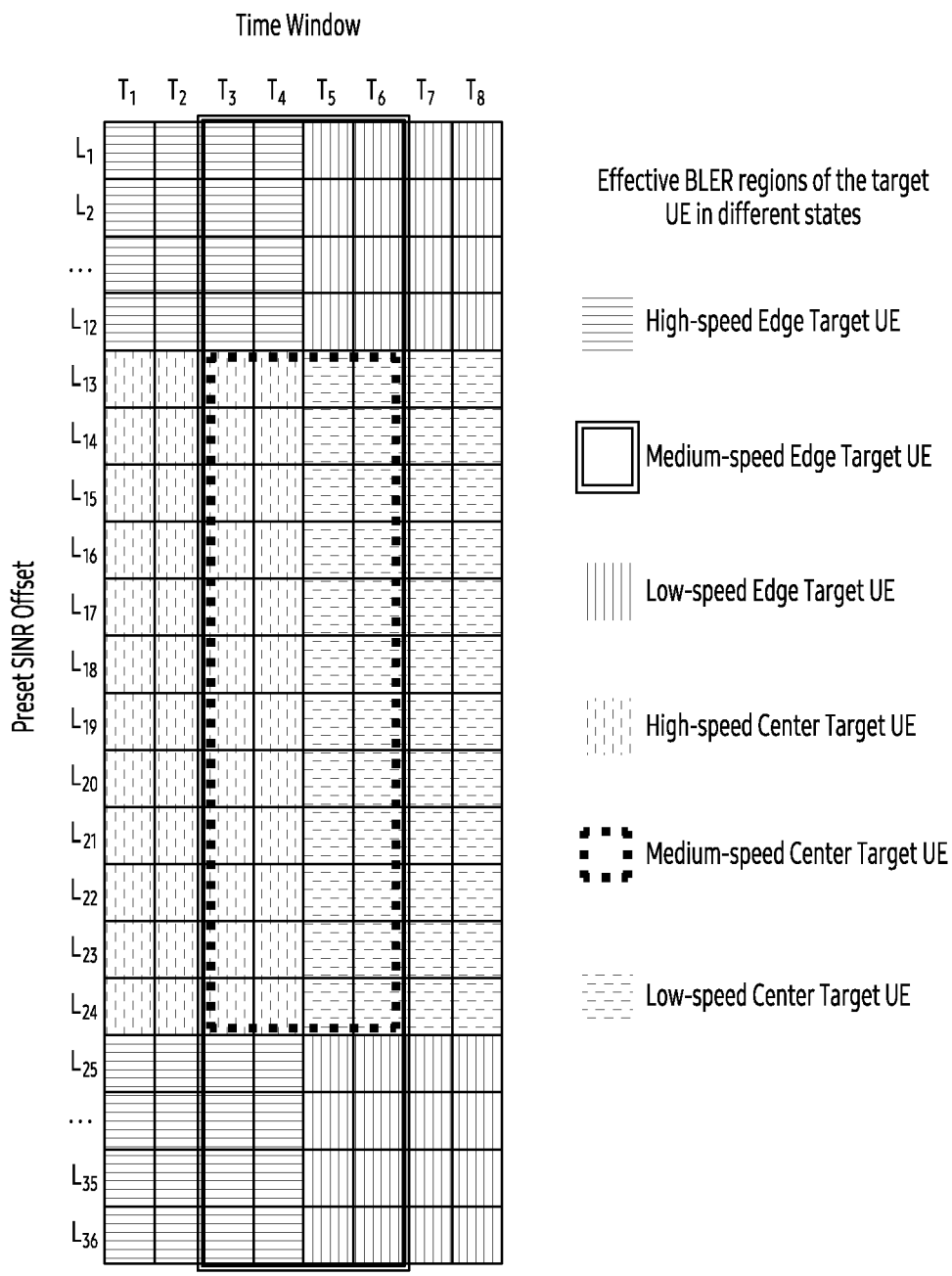
FIG. 10 is an effective BLER region of a target UE in a different state in an example according to an example embodiment.

FIG. 10 is an effective BLER region of a target UE in a different state in an example according to an example embodiment.

In the above way of acquiring the effective BLER, effective BLER regions of the target UE in different states may be obtained. As shown in FIG. 10, the respective effective BLER regions 1000 of a high-speed edge target UE, a medium-speed edge target UE, a low-speed edge target UE, a high-speed center target UE, a medium-speed center target UE and a low-speed center target UE are shown. The corresponding BLER table may be obtained by setting the BLERs other than the respective BLER region.

FIG. 11 is the second BLER table of a high-speed edge target UE in an example according to an example embodiment. As shown in FIG. 11, the second BLER table 1100 of the high-speed edge target UE is shown.

The above operation of selecting the effective BLER can reduce the interference of redundant information in the subsequent prediction process and can improve the accuracy of the result of subsequent prediction. In addition, since all non-effective BLERs are set as zero and do not participate in calculation in the subsequent prediction process, the processing efficiency of the prediction process can also be improved.

In an example embodiment, the predicting, by the first AI network, the short-term SINR offset corresponding to the target UE based on the second BLER information comprises:
  acquiring effective decoding feedback number information of the target UE, the effective decoding feedback number information comprising the number of effective decoding feedbacks corresponding to a preset time window in which each BLER in the second BLER information is not zero; and
  predicting, by the first AI network, the short-term SINR offset corresponding to the target UE based on the second BLER information and the effective decoding feedback number information.

Specifically, the effective decoding feedback number information includes the number of effective decoding feedbacks corresponding to a preset time window in which each BLER in the second BLER information is not zero. The number of effective decoding feedbacks corresponding each preset time window may be obtained based on the above correspondence table, where all decoding feedbacks having decoding feedback values of ACK or NACK are effective decoding feedbacks.

The effective decoding feedback number information may be represented by a table. This table may be called an effective decoding feedback number table (or effective HARO ratio table (EHRT)). Considering that the arrival time and size of data packets of the user are different, the time point when the user feeds back the ACK/NACK of data is not fixed. Therefore, the number of effective decoding feedbacks in different preset time windows is different. If the number of effective decoding feedbacks is larger, the calculated BLER is more accurate. Thus, the weight value of the BLER of each preset time window in the prediction process may be calculated subsequently according to the number of effective decoding feedbacks in each preset time window.

By way of example above, the effective preset time window may be selected according to the movement feature of the target UE, and the number of ACK/NACK feedback information in the effective preset time window is the number of effective decoding feedbacks. For example, when the target UE is a high-speed user (>=30 km/h), short preset time window $T_1$, $T_2$, $T_3$ and $T_4$ are selected for the target UE; when the target UE is a medium-speed user (>3 km/h and <30 km/h), moderate preset time window $T_3$, $T_4$, $T_5$ and $T_6$ are selected for the target UE; and, when the target UE is a low-speed user (<=3 km/h), long preset time windows $T_5$, $T_6$, $T_7$ and $T_8$ are selected for the target UE. Then, the number of effective decoding feedbacks in each effective preset time window is obtained.

FIG. 12 is a table of the number of effective decoding feedbacks of the high-speed edge target UE in an example according to an example embodiment. FIG. 12 is a diagram 1200 showing the EHRT of a high-speed edge target UE.

In an example embodiment, the predicting, by the first AI network, the short-term SINR offset corresponding to the target UE based on the second BLER information and the effective decoding feedback number information comprises:

acquiring corresponding predicted BLER information based on the second BLER information, the predicted BLER information including first predicted BLERs of each time window under different preset SINR offsets;

acquiring a predicted weight corresponding to each time window based on the predicted BLER information and the effective decoding feedback number information;

for each preset SINR offset, weighting, based on the predicted weight corresponding to each time window, the first predicted BLER corresponding to each time window under the preset SINR offset to obtain the second predicted BLER corresponding to the preset SINR offset; and acquiring, from each preset SINR offset, the short-term SINR offset based on the second predicted BLER corresponding to each preset SINR offset.

Figure 13A:
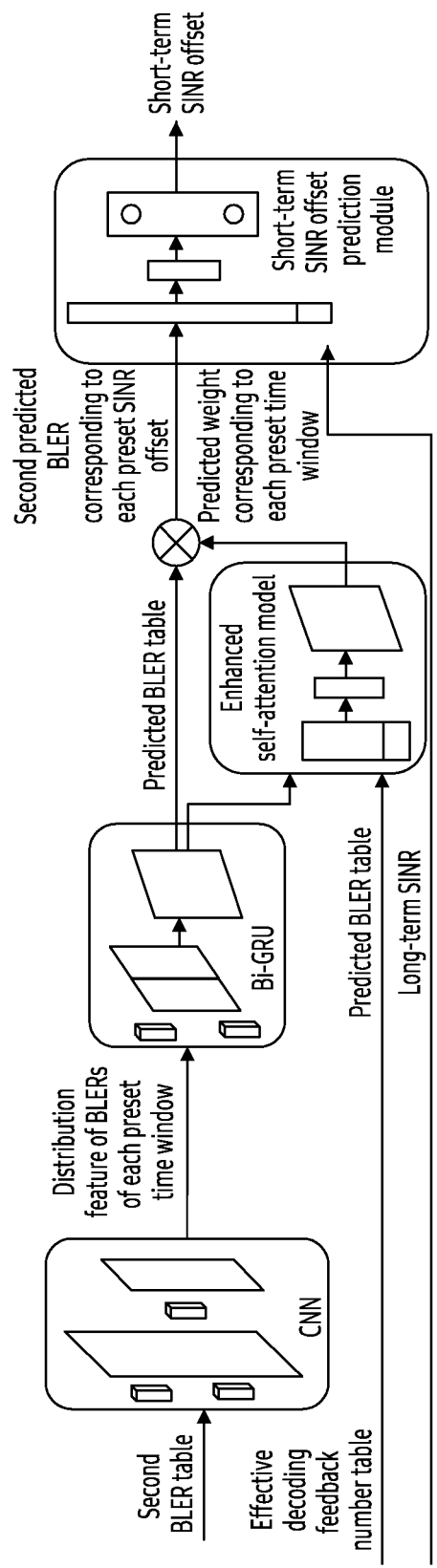
FIG. 13a is a schematic structure diagram of the first AI network in an example according to an embodiment of the present disclosure.

FIG. 13a is a schematic structure diagram of the first AI network in an example according to an embodiment of the present disclosure.

As shown in FIG. 13a, the first AI network may include a feature extraction module, a BLER prediction module, an attention module and a short-term SINR offset prediction module. The relationship among the modules and the process 1300 of acquiring the short-term SINR offset are shown in FIG. 13a.

Specifically, the second BLER information and the effective decoding feedback number information are input into the first AI network and processed by the modules to eventually obtain the corresponding real-time SINR offset.

In an example embodiment, the acquiring corresponding predicted BLER information based on the second BLER information comprises:

acquiring, by the feature extraction module in the first AI network, a distribution feature of BLERs in each preset time window based on the second BLER information; and acquiring, by the BLER prediction module in the first AI network, the predicted BLER information based on the distribution feature.

The feature extraction module in the first AI network may be a CNN model. The BLER prediction module in the first AI network may be a Bi-GRU model.

Specifically, the distribution feature of effective BLERs of the target UE in different preset time windows are extracted based on the second BLER information by using the CNN model. The distribution feature may include means, variances, gradients, etc. The distribution feature of BLERs in one preset time window can reflect the change of BLERs of the target UE in this time window under different preset SINR offsets. Based on the extracted distribution feature of effective BLERs of the target UE in different preset time windows, first predicted BLERs at the next moment in different preset time windows under different preset SINR offsets are predicted by using the Bi-GRU model, so that the predicted BLER information is obtained. These first predicted BLERs may be identified in the form of table, e.g., a predicted BLER table.

In an example embodiment, the acquiring a predicted weight corresponding to each time window based on the predicted BLER information and the effective decoding feedback number information comprises:

acquiring, by the attention module in the first AI network, a change feature of the first predicted BLER with different preset SINR offsets in different preset time windows based on the predicted BLER information, acquiring the number of effective decoding feedbacks in different preset time windows based on the effective decoding feedback number information, and acquiring a predicted weight corresponding to each preset time window based on the change feature and the number of effective decoding feedbacks.

The attention module in the first AI network may be an enhanced self-attention model.

Specifically, the predicted weight corresponding to each preset time window is acquired based on the predicted BLER table and the effective decoding feedback table by the enhanced self-attention model.

Specifically, the enhanced self-attention model will consider two factors when determining the predicted weight of each predicted time window.

Factor 1: the number of effective ACKs/NACKs in the preset time window. If the number of effective ACKs/NACKs is larger, the weight value of the preset time window is larger. That is, the number of effective decoding feedbacks in each preset time window is obtained through the effective decoding feedback table. If the number of effective ACKs/NACKs is larger, the predicted weight of the corresponding preset time window is larger.

Factor 2: the change of predicted BLERs in different time windows with the preset SINR offset. When the change of BLERs in a short preset time window is close to the change of BLERs in a long preset time window, it indicates that the channel state of the target UE changes slowly, and the predicted weigh of the long preset time window is larger at this time; and, when the change of BLERs in a short preset time window greatly differs from the change of BLERs in a long preset time window, it indicates that the channel state of the target UE changes rapidly, and the predicted weight of the short preset time window is larger at this time.

After the predicted weight of each preset time window is obtained, the weighted predicted BLER (e.g., the second predicted BLER) corresponding to each preset SINR offset is obtained by weighting each predicted weight.

In an example embodiment, the acquiring, from each preset SINR offset, the short-term SINR offset based on the second predicted BLER corresponding to each preset SINR offset comprises:

acquiring, by the short-term SINR offset prediction module in the first AI network, the throughput of the target UE under each preset SINR offset based on the second predicted BLER corresponding to each preset SINR offset; and determining, as the short-term SINR offset, a preset SINR offset corresponding to the maximum or a high throughput in each preset SINR offset.

The short-term SINR offset prediction module may be a fully-connected network model.

Specifically, the short-term SINR offset of the target UE is determined based on the long-term SINR corresponding to the target UE and the second predicted BLER corresponding to each preset SINR offset according to the principle of maximizing or increasing the throughput of the target UE. Specifically, the second predicted BLER corresponding to each preset SINR offset is first normalized to obtain the normalized second predicted BLER corresponding to each preset SINR offset. Then, the throughput corresponding to each preset SINR offset is calculated in the following way, and the preset SINR offset corresponding to the maximum or an increased throughput is selected as the short-term SINR offset of the target UE.

$$\max \text{ UE throughput} = \max\{MCS*(1-BLER)\}$$

where UE throughput is the throughput, BLER is the normalized second predicted BLER, and MCS is the MCS level.

Figure 13B:
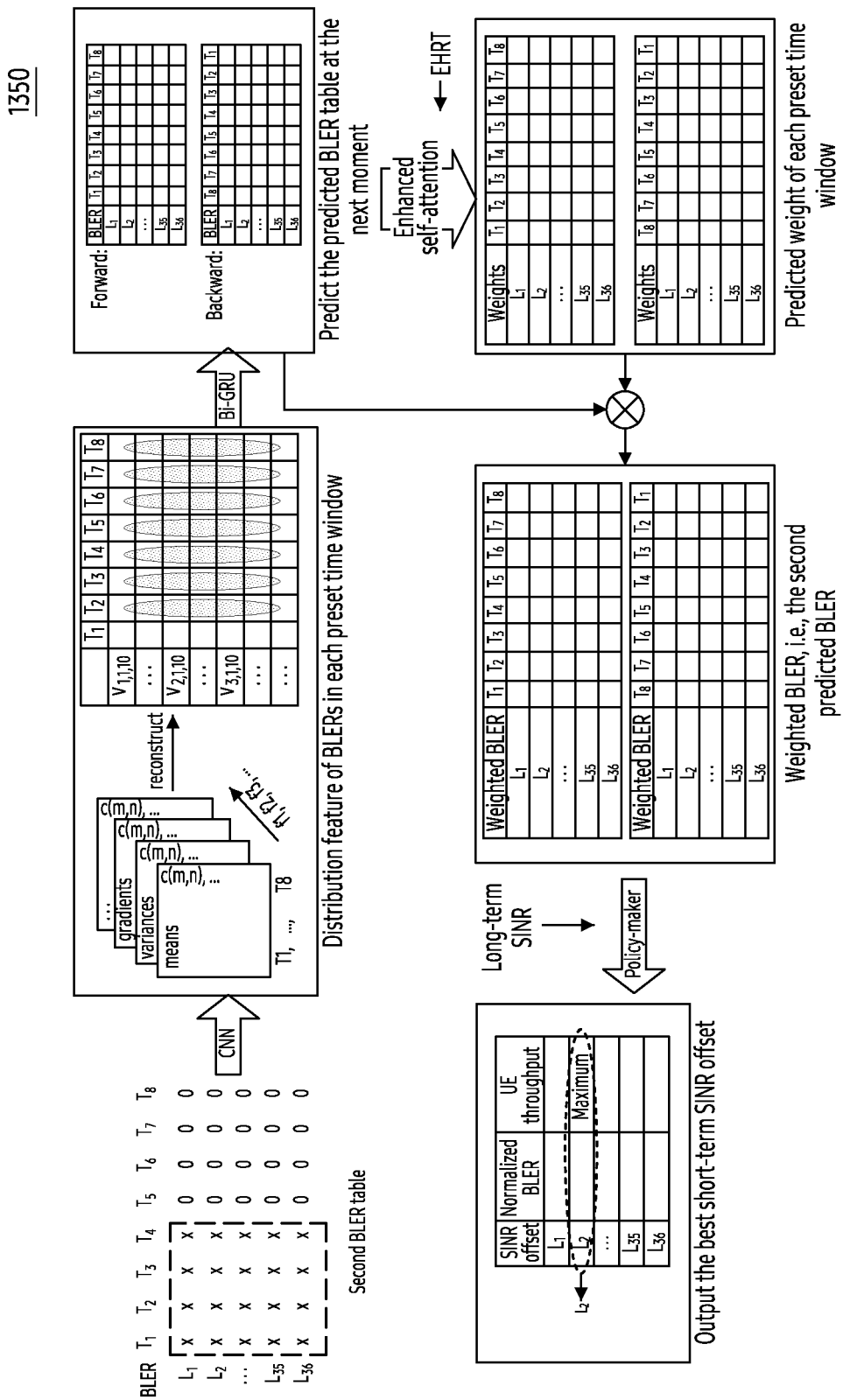
FIG. 13b is a data process of predicting a short-term SINR offset by the first AI network in an example according to an example embodiment.

FIG. 13b is a data process of predicting a short-term SINR offset by the first AI network in an example according to an example embodiment. FIG. 13b shows a data process 1350 of predicting the short-term SINR offset by the first AI network. As shown in FIG. 13b, the data process 1350 may include the following steps.

First, the second BLER table is input into the CNN model, and the distribution feature of BLERs in each preset time window is output. As shown, f1, f2 and f3 represent three different feature values, which may be means, variances or gradients (other types of feature values may also be possible, and it may be set according to the requirements). The c(m,n) represents the feature value calculated for a certain feature by selecting the BLER values corresponding to the $m^{th}$ to $n^{th}$ L values. After each distribution feature is obtained, these distribution features are reconstructed to obtain a corresponding 2D feature map. The v(f,m,n) represents the value of the feature f calculated by selecting the BLER values corresponding to the $m^{th}$ to $n^{th}$ L values. For example, v(1,2,35) represents the mean (f1) of BLERs calculated by selecting the BLER values corresponding to the $2^{nd}$ to $35^{th}$ L values.

Then, the 2D feature map corresponding to the extracted distribution feature is input into the Bi-GRU, and the predicted BLER table at the next moment is output, including a forward predicted BLER table and a backward predicted BLER table. The two tables contain the first predicted BLERs in different preset time windows. In the processing process of the Bi-GRU, forward means that the information is acquired from front to back, that is, the predicted information is acquired sequentially in the order from $T_1$ to $T_8$ ($T_1 \rightarrow T_2 \rightarrow T_3 \rightarrow \ldots \rightarrow T_8$); and, backward means that the information is acquired from back to front, that is, the predicted information is acquired sequentially in the order from $T_8$ to $T_1$ ($T_8 \rightarrow T_7 \rightarrow T_6 \rightarrow \ldots \rightarrow T_1$). For example, if the forward is adopted, $T_1, \ldots, T_4$ contain less effective information, so the accuracy of prediction is improved by using the backward information of $T_8, \ldots, T_5$.

Next, the predicted BLER table output by the Bi-GRU and the EHRT are input together into the enhanced self-attention model, and the predicted weight of each preset time window is output. Then, the obtained predicted weight is weighted to obtain a weighted BLER, that is, the second predicted BLER corresponding to each preset SINR offset is obtained.

Then, the second predicted BLER corresponding to each preset SINR offset and the long-term SINR are input into the short-term SINR offset prediction model (Policy-marker), and the short-term SINR offset is output. Specifically, the preset SINR offset corresponding to the maximum or a high UE throughput is selected from each preset SINR offset as the short-term SINR offset. In order to maximize or increase the UE throughput, the best MCS and second predicted BLER combination may be selected.

In an example embodiment, the method may further comprise:

predicting, by the second AI network, a long-term SINR corresponding to the target UE based on the channel related information; and the acquiring MCS related information corresponding to the target UE based on the short-term SINR offset comprises:

acquiring the MCS related information corresponding to the target UE based on the short-term SINR offset and the long-term SINR.

Specifically, during the acquisition of the real-time SINR offset corresponding to the target UE, it is also necessary to acquire the long-term SINR corresponding to the target UE. In an example embodiment, the long-term SINR corresponding to the target UE may be predicted based on the channel related information by the second AI network.

After the real-time SINR offset and the long-term SINR corresponding to the target UE are acquired, the real-time SINR corresponding to the target UE may be calculated. Considering that served UEs have different channel states in different base station environments, the weight of the short-term SINR offset corresponding to each base station may be preset based on the base station environment, and the real-time SINR value corresponding to the UE is calculated by using the weight. The specific formula is as follow:

$$\text{Real-time SINR} = (\text{long-term SINR}) + \alpha \times (\text{short-term SINR offset})$$

where Real-time SINR is the real-time SINR of the target UE, long-term SINR is the long-term SINR of the target UE, $\alpha$ is a weight determined by the cell scenario, and the typical value of $\alpha$ may be obtained by laboratory tests.

Figure 14B:
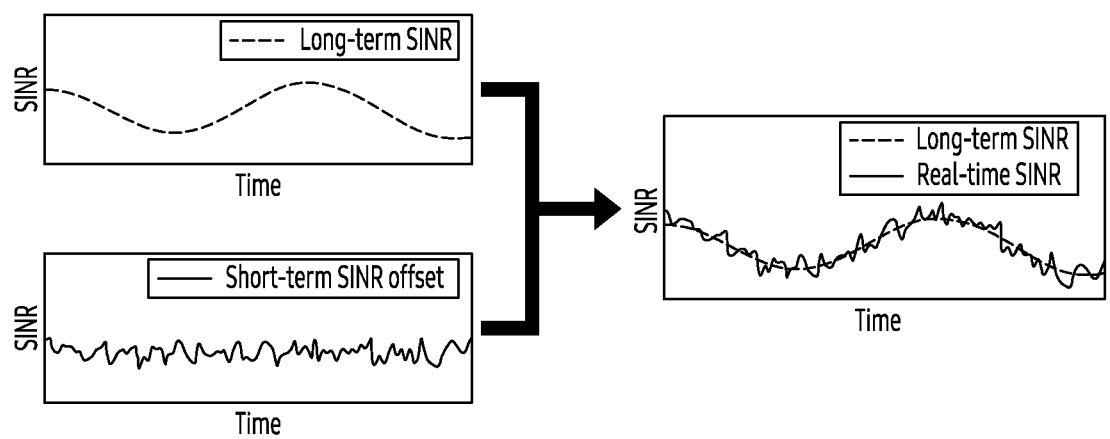
FIG. 14b is a schematic diagram of acquiring the real-time SINR based on the long-term SINR and the short-term SINR offset in an example according to an example embodiment.

FIG. 14a is typical values of the weight of the short-term SINR offset in various scenarios in an example according to an example embodiment. FIG. 14a shows the typical values 1400 of $\alpha$ in various scenarios. FIG. 14b is a schematic diagram of acquiring the real-time SINR based on the long-term SINR and the short-term SINR offset in an example according to an example embodiment. FIG. 14b shows a schematic diagram 1450 of acquiring the real-time SINR (e.g., Real-time SINR in this figure) based on the long-term SINR (e.g., Long-term SINR in this figure) and the short-term SINR offset (e.g., Short-term SINR offset in this figure).

After the real-time SINR of the target UE is acquired, the MCS corresponding to the real-time SINR may be acquired according to the preset mapping relationship between different MCSs and different SINRs. The specific formula is as follow:

MCS=SINR_TO_MCS[real-time SINR]

where SINR_TO_MCS is the mapping relationship between different MCSs and different SINRs, real-time SINR is the real-time SINR, and MCS is the MCS eventually selected for the target UE.

In an example embodiment, the predicting, by the second AI network, a long-term SINR corresponding to the target UE based on the channel related information comprises:
  acquiring, based on the channel related information, at least one of CQI information, RSRP information and RSRQ information of the target UE; and
  predicting, by the first AI network, the long-term SINR corresponding to the target UE based on at least one of the CQI information, the RSRP information and the RSRQ information.

The second AI prediction network is a support vector regression (SVR) network or a long short-term memory (LSTM) network.

Figure 15:
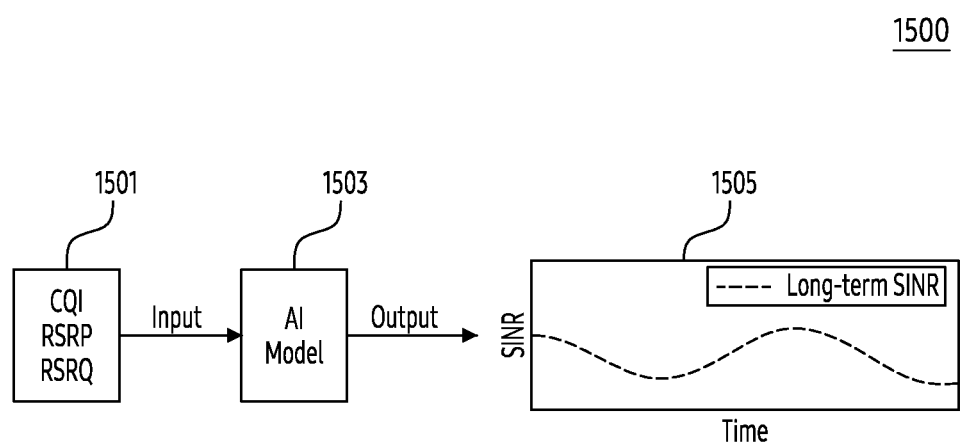
FIG. 15 is a schematic diagram of acquiring the long-term SINR in an example according to an example embodiment.

FIG. 15 is a schematic diagram of acquiring the long-term SINR in an example according to an example embodiment. Specifically, as shown in FIG. 15, the CQI information, the RQRP information and the RSRQ information of the target UE 1501 are input into the second AI prediction network 1503, and the corresponding long-term SINR 1505 is output.

In an example embodiment, before acquiring the MCS related information corresponding to the target UE, the method further comprises:
  determining the target UE to be an edge UE, when it is determined to perform resource scheduling on the target UE.

Specifically, the determining the target UE to be an edge UE comprises:
  determining the target UE to be an edge UE based on at least one of the RSRP, RSRQ, SINR and position information corresponding to the target UE.

Figure 16:
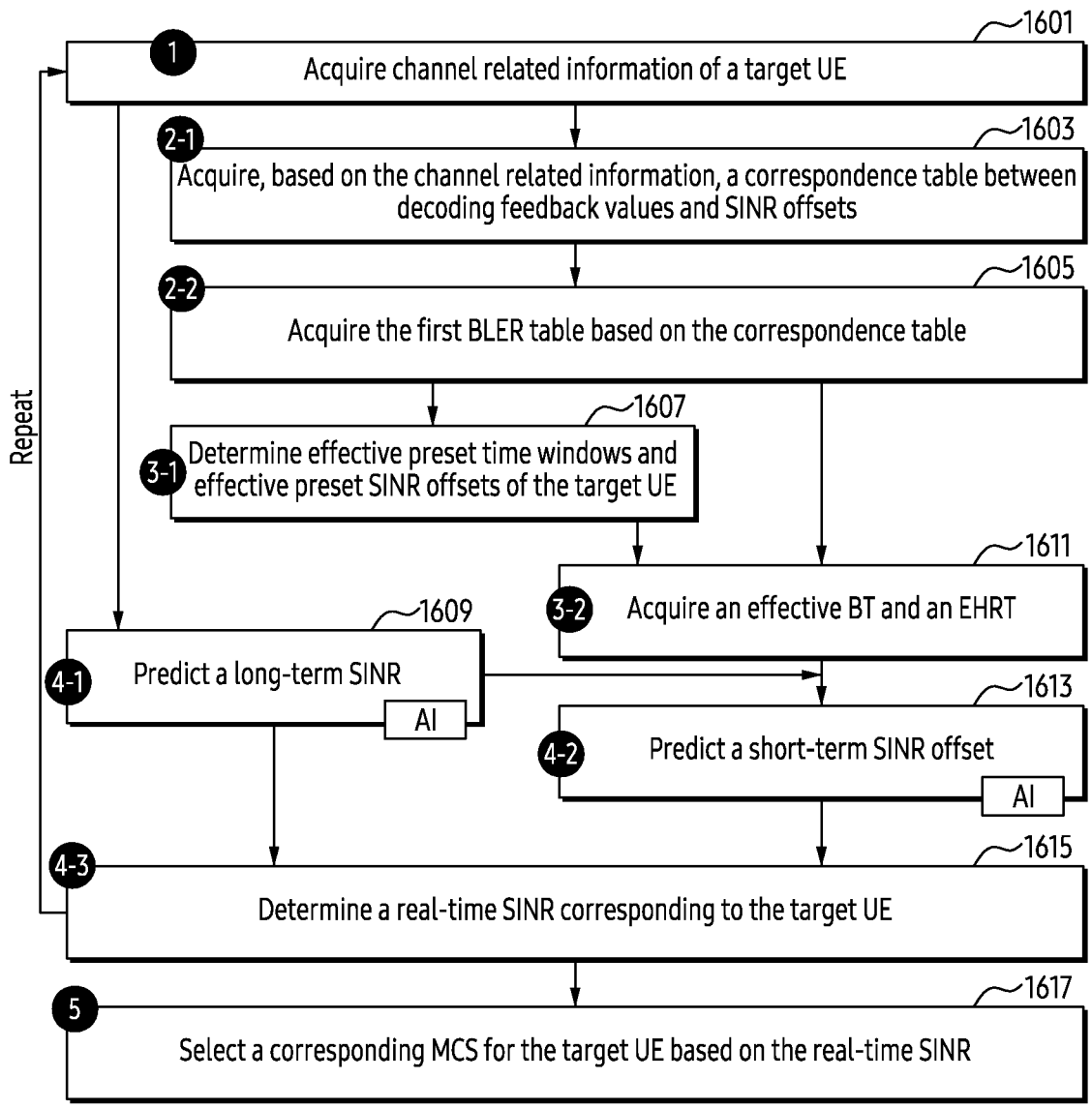
FIG. 16 is a schematic diagram of a specific process of determining the MCS of the target UE in an example according to an example embodiment.

FIG. 16 is a schematic diagram of a specific process of determining the MCS of the target UE in an example according to an example embodiment In conclusion, as shown in FIG. 16, the scheme 1600 of determining the MCS of the target UE in an example embodiment may include the following several steps. For example, the operations described in FIG. 16 may be performed by a network device (e.g., base station, DU, and/or RU).

In step 1, channel related information of the target UE is acquired, including CQI information, RSRP information, RSRQ information, decoding feedback information, position information, movement speed information, etc. For example, in operation 1601, the network device may acquire the channel related information of the target UE.

In step 2, a corresponding first BLER table (BT) is determined according to the related information of the target UE, specifically:

In 2-1, a correspondence table between decoding feedback values and SINR offsets (e.g., actual SINR offsets) is acquired based on the channel related information. For example, in operation 1603, the network device may acquire, based on the channel related information, the correspondence table between decoding feedback values and SINR offsets.

In 2-2, the first BLER table is acquired based on the correspondence table. For example, in operation 1605, the network device may acquire the first BLER table based on the correspondence table.

In step 3, the second BLER table is acquired based on the first BLER table, specifically:

In 3-1, effective preset time windows and effective preset SINR offsets of the target UE are determined. For example, in operation 1607, the network device may determine effective preset time windows and effective preset SINR offsets of the target UE.

In 3-2, the second BLER table (effective BT) is acquired from the first BLER table based on the effective preset time windows and the effective preset SINR offsets, and the number of effective decoding feedbacks (EHRT) corresponding to the second BLER table is determined. For example, in operation 1611, the network device may acquire the effective BT and the EHRT.

In step 4, a real-time SINR corresponding to the target UE is determined, specifically:

In 4-1, a long-term SINR corresponding to the target UE is predicted based on the channel related information by the corresponding AI network. For example, in operation 1609, the network device may predict a long-term SINR.

In 4-2, a short-term SINR offset corresponding to the target UE is predicted based on the effective BT, the corresponding EHRT and the long-term SINR by the corresponding AI network. For example, in operation 1613, the network device may predict a short-term SINR offset.

In 4-3, the real-time SINR corresponding to the target UE is determined based on the long-term SINR and the SINR offset. For example, in operation 1615, the network device may determine a real-time SINR corresponding to the target UE.

In step 5, the corresponding MCS is selected for the target UE based on the real-time SINR. For example, in operation 1617, the network device may select a corresponding MCS for the target UE based on the real-time SINR.

The steps 1 to 4 may be repeated periodically.

In an example embodiment, the acquiring MCS related information corresponding to the target UE comprises:
  transmitting the acquired channel related information of the target UE to another network node, and determining, by the another network node and through an AI network, the MCS related information corresponding to the target UE based on the channel related information; and
  receiving the MCS related information corresponding to the target UE transmitted by the another network node.

In an example embodiment, the acquiring MCS related information corresponding to the target UE comprises:
  transmitting the acquired channel related information of the target UE to another network node, determining, by the another network node and through an AI network, the MCS related information corresponding to the target UE based on the channel related information, and determining an MCS corresponding to the target UE based on the MCS related information; and
  receiving the MCS corresponding to the target UE transmitted by the another network node.

The another network node is an RAN intelligent controller (RIC).

Specifically, in an example embodiment, the MCS related information may be acquired by the AI network. When the base station has sufficient computing power, the AI network may be deployed on the base station; and, when the base station has insufficient computing power, the AI network may be deployed on another network node. When the AI network is deployed on the another network node, the base station transmits the channel related information to this network node, and receives the MCS related information fed back by this network node and/or the MCS determined based on the MCS related information. In other words, when the AI network is deployed on the another network node, after the MCS related information is acquired by the network node, it is possible that the MCS is determined and then fed back to the base station, or it is also possible that the MCS related information is directly fed back to the base station and the base station determines the MCS based on the received MCS related information.

Figure 17:
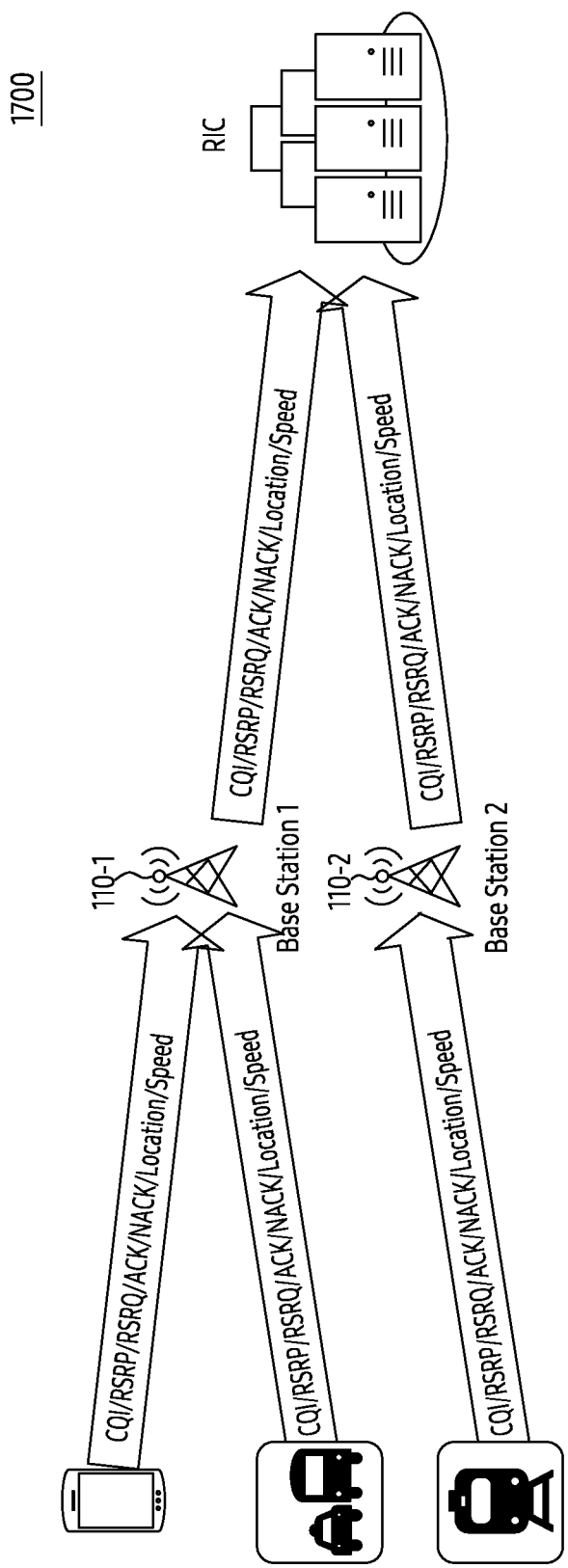
FIG. 17 is a schematic diagram of forwarding, by a base station, channel related information to an RIC in an example embodiment.

FIG. 17 is a schematic diagram of forwarding, by a base station, channel related information to an RIC in an example embodiment. When the AI network is deployed on an RIC node in deployment 1700, as shown in FIG. 17, each base station (only two base stations are schematically shown in the figure, the first base station 110-1 and the second base station 110-2) needs to forward the received channel related information of the UE to the RIC, and the RIC acquires the MCS related information and/or the MCS in the way described in the above embodiments.

Figure 18:
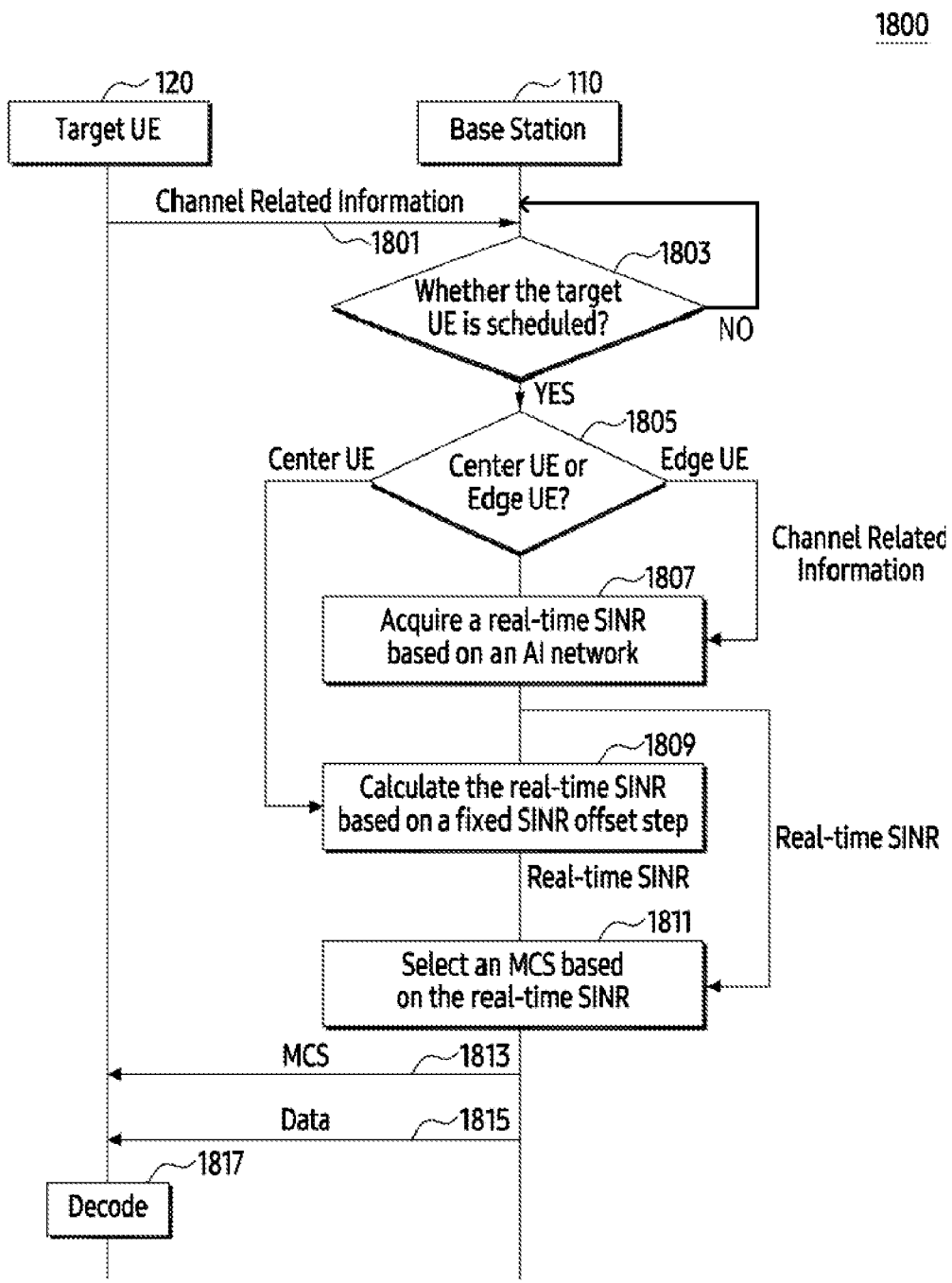
FIG. 18 is flowchart of the interaction between the base station and the target UE when the AI network is deployed on the base station in an example embodiment.

FIG. 18 is flowchart of the interaction between the base station and the target UE when the AI network is deployed on the base station in an example embodiment. Specifically, FIG. 18 shows an interaction process 1800 between the base station 110 and the target UE 120 when the AI network is deployed on the base station. The process may include the following steps.

In operation 1801, the target UE 120 reports channel related information to the base station 110.

In operation 1803, the base station 100 determines whether the target UE is scheduled or not. Upon acquiring the channel related information, the base station 110 determines whether the target UE 120 is scheduled. If the target UE 120 is not scheduled, the base station 100 may repeat the operation 1803 or wait the scheduling of the target UE 120. If the base station 110 determines that the target UE 120 is scheduled, the base station continuously determines whether the UE is an edge UE.

In operation 1805, the base station 100 determines whether the target UE 120 is a center UE or an edge UE. If it is determined that the target UE 120 is an edge UE, the process proceeds to operation 1807; and, if it is determined that the UE is a center UE, the process proceeds to operation 1809.

In operation 1807, the base station 110 acquires, based on the channel related information, the real-time SINR corresponding to the target UE 120 through the AI network deployed on the base station.

In operation 1809, the base station 110 calculates, based on the channel related information, the real-time SINR corresponding to the target UE 120 by using a fixed SINR offset step (e.g., the fixed adjustment step in the prior art).

In operation 1811, the base station 110 selects an MCS for the target UE 120 based on the real-time SINR.

In operation 1813, the base station 110 transmits the MCS to the target UE 120.

In operation 1815. the base station 110 transmits data to the target UE 120 based on the MCS.

In operation 1817, the target UE 120 decodes the received data based on the MCS.

Figure 19:
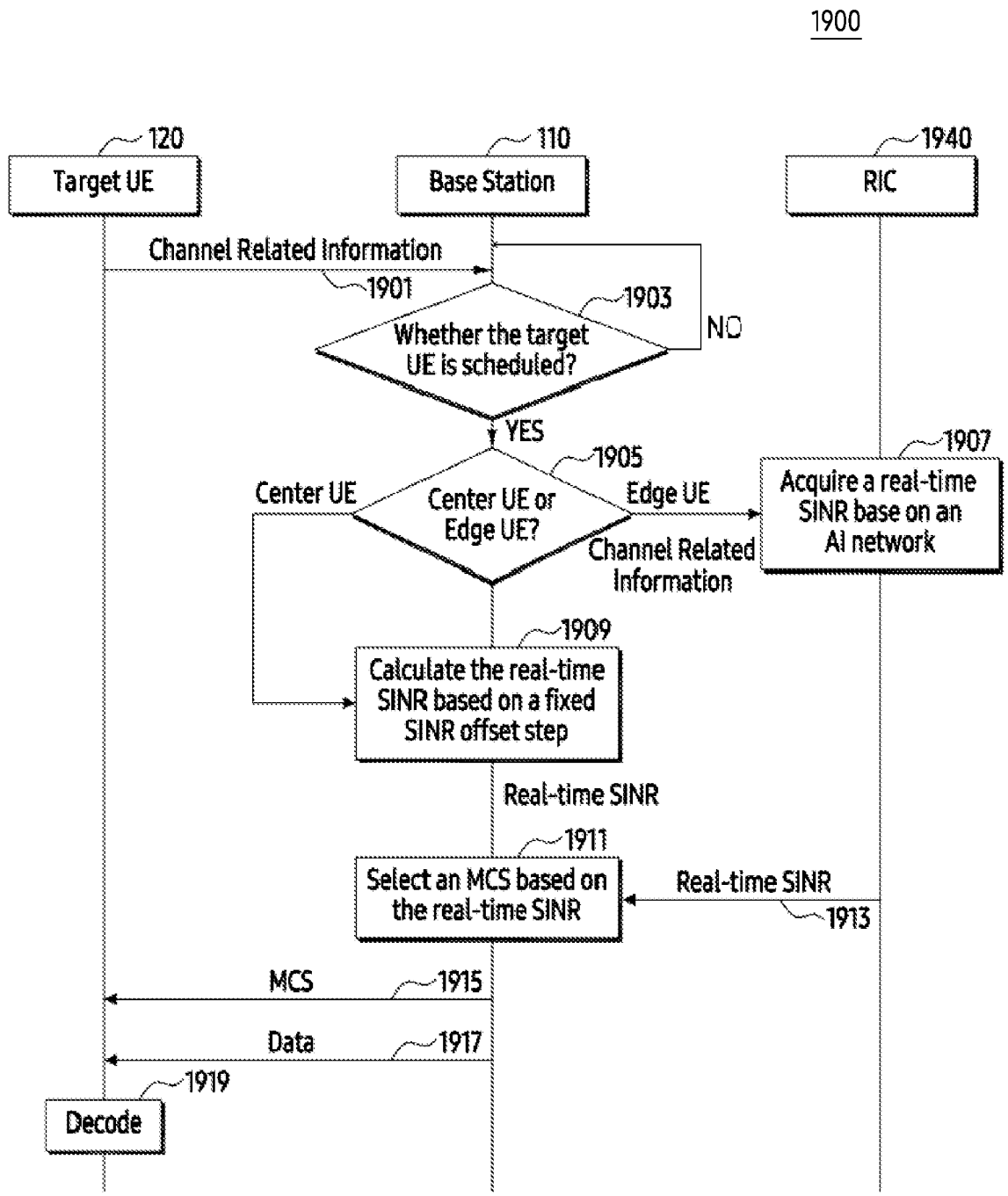
FIG. 19 is flowchart of the interaction among the base station, the target UE and the RIC when the AI network is deployed on the RIC in an example embodiment.

FIG. 19 is flowchart of the interaction among the base station, the target UE and the RIC when the AI network is deployed on the RIC in an example embodiment. FIG. 19 shows an interaction process among the base station 110, the target UE 120 and the RIC 1940 when the AI network is deployed on the RIC 1940. The process may include the following steps.

In operation 1901, the target UE 120 reports channel related information to the base station 110.

In operation 1903, the base station 100 determines whether the target UE is scheduled or not. Upon acquiring the channel related information, the base station 110 determines whether the target UE 120 is scheduled. If the target UE 120 is not scheduled, the base station 100 may repeat the operation 1903 or wait the scheduling of the target UE 120. If the base station 110 determines that the target UE 120 is scheduled, the base station 110 continuously determines whether the target UE 120 is an edge UE.

In operation 1905, the base station 100 determines whether the target UE 120 is a center UE or an edge UE. If it is determined that the target UE 120 is an edge UE, the process proceeds to step 1907; and, if it is determined that the target UE is a center UE, the process proceeds to step 1909. In case that the target UE is the edge UE, the base station 110 transmits the channel related information of the target UE 120 to the RIC 1940.

In operation 1907, the RIC 1940 acquires, based on the channel related information, the real-time SINR corresponding to the target UE 120 through the AI network deployed on the RIC 1940.

In operation 1913, the RIC 1940 transmits the acquired real-time SINR to the base station 110. The base station 110 obtains the real-time SINR from the RIC 1940.

In case that the target UE is the center UE, the base station 110 perform the operation 1909. In operation 1909, the base station 110 calculates, based on the channel related information, the real-time SINR corresponding to the target UE 120 by using a fixed SINR offset step. The base station 110 obtains the real-time SINR based on the calculation.

In operation 1911, the base station 110 selects an MCS for the target UE 120 based on the real-time SINR.

In operation 1916, the base station 110 transmits the MCS to the target UE 120.

In operation 1917, the base station 110 transmits data to the target UE 120 based on the MCS.

In operation 1919, the target UE 120 decodes the received data based on the MCS.

Figure 20:
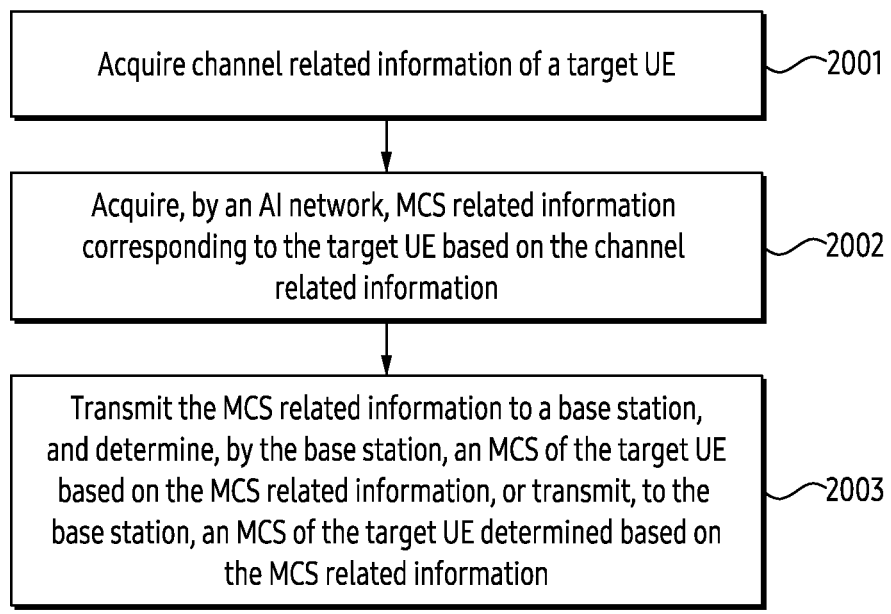
FIG. 20 is a flowchart of a method executed by a network node according to an example embodiment.

FIG. 20 is a flowchart of a method executed by a network node according to an example embodiment. As shown in FIG. 20, the method may include the following steps.

In operation 2001, channel related information of a target user equipment (UE) is acquired.

In operation 2002, MCS related information corresponding to the target UE is acquired based on the channel related information by an AI network.

In operation 2003, the MCS related information is transmitted to a base station, and the base station determines an MCS of the target UE based on the MCS related information, or an MCS of the target UE determined based on the MCS related information is transmitted to the base station.

The target UE includes an edge UE, and the number of MCS change value of the edge UE is greater than the number of MCS change value of a center UE.

The network node is an RAN intelligent controller (RIC).

Specifically, this scheme is a scheme when the AI network is deployed on another network node, and the process of acquiring the MCS related information and the MCS is the same as that in the above embodiments and will not be repeated here.

In the scheme provided by the present disclosure, the corresponding MCS related information is acquired by a trained AI network based on the channel related information of the target UE, and the MCS of the target UE is then determined by using the acquired MCS related information.

Since the MCS related information acquired by the AI network can accurately reflect the channel state of the target UE, the determined MCS is more accurate, and the user throughput is thus improved.

Each embodiment herein may be used in combination with any other embodiment(s) described herein.

Figure 21:
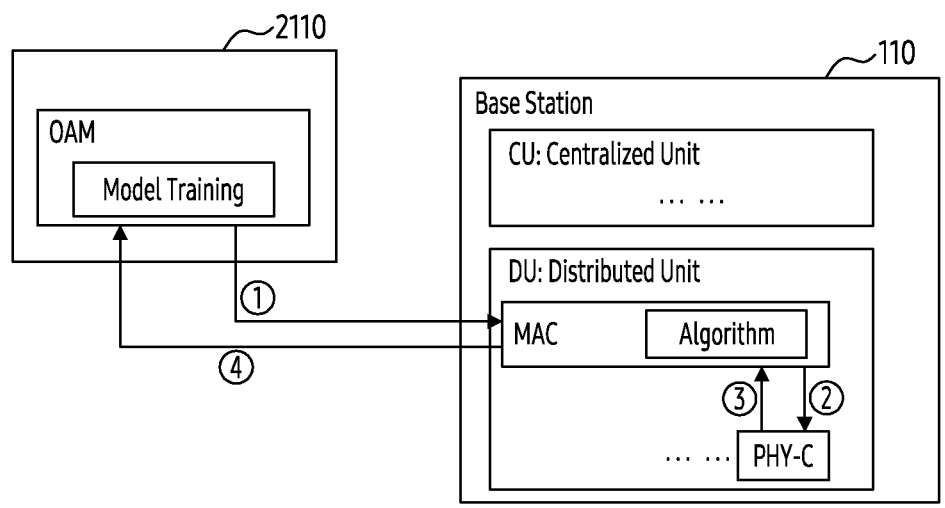
FIG. 21 is an example of deployment on a base station side according to an example embodiment.

FIG. 21 is an example of algorithm deployment on a base station side: an AI module (comprising processing circuitry) is deployed in an operation and maintenance (OAM) 2110 for model training, and the algorithm is executed in a distributed unit (DU) of a base station 110. The base station 110 can be divided into a centralized unit (CU) and the DU based on a function split. The main process of the system includes the following.

The OAM 2110 transmits the trained model to an MAC.

The MAC performs a link adaptation operation according to the algorithm, and adaptively modifies parameters transmitted by a PHY-C.

The PHY-C periodically transmits the result of measurement to the MAC for link adaptation and model training.

The MAC periodically transmits the collected data to the OAM 2110 for training.

Figure 22:
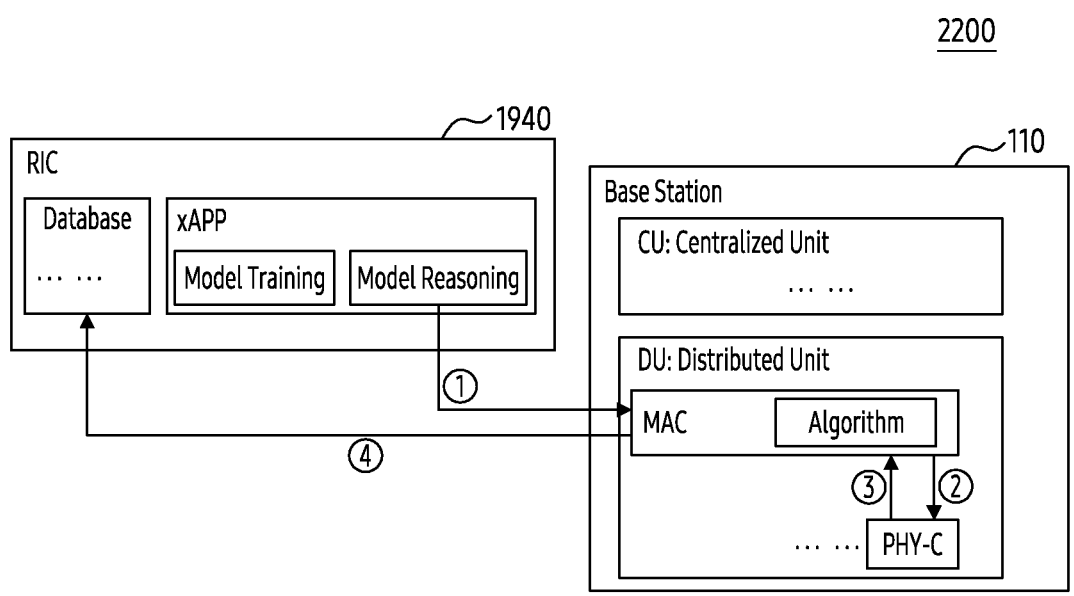
FIG. 22 is an example of deployment on an RIC side according to an example embodiment.

FIG. 22 is an example of algorithm deployment on an RIC side: an AI module (comprising processing circuitry) is deployed in the RIC 1940 for model training, and the algorithm may be executed in a xAPP of the RIC 1940 and a DU of a base station 110. The main process of the system includes the following.

A model reasoning model performs SINR prediction and transmits the result of prediction to an MAC.

The MAC performs a link adaptation operation according to the predicted SINR result, and transmits parameters to a PHY-C.

The PHY-C periodically transmits the result of measurement to the MAC for link adaptation and model training.

The MAC periodically transmits the collected data to the RIC for model training and model reasoning.

An example embodiment further provides an electronic device, comprising a processor, and optionally a transceiver and/or memory coupled to the processor, wherein the processor is configured to execute the steps of the method according to any one of the optional embodiments of the present disclosure. For example, the electronic device described herein may be the base station 110, the RIC 1940, the target UE 120, or other network device (e.g., DU, RU, CU of the base station 110).

Figure 23:
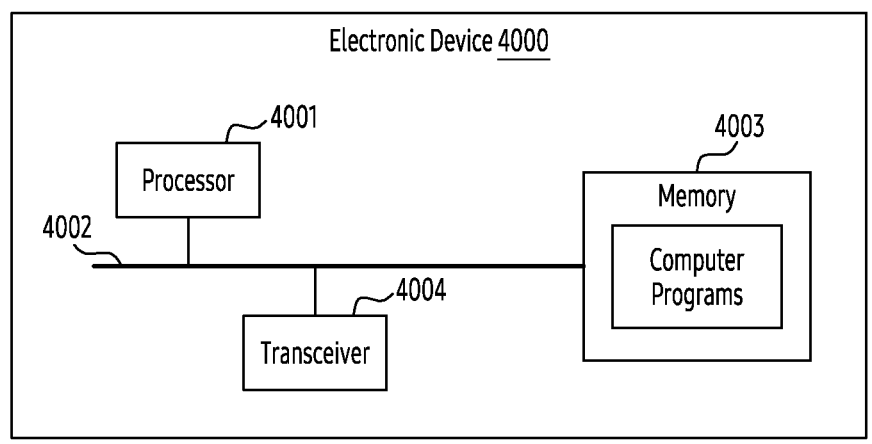
FIG. 23 is a schematic structure diagram of an electronic device according to an example embodiment.

FIG. 23 shows a schematic structure diagram of an electronic device to which an embodiment is applied. As shown in FIG. 23, the electronic device 4000 shown in FIG. 23 may include a processor 4001 and a memory 4003. The processor 4001 is connected, directly or indirectly, to the memory 4003, for example, through a bus 4002. Optionally, the electronic device 4000 may further include a transceiver 4004, and the transceiver 4004 may be used for data interaction between the electronic device and other electronic devices, such as data transmission and/or data reception. It should be noted that, in practical applications, the transceiver 4004 is not limited to one, and the structure of the electronic device 4000 does not constitute a limitation to the embodiments of the present disclosure.

The processor 4001 may be a CPU (Central Processing Unit), a general-purpose processor, a DSP (Digital Signal Processor), an ASIC (Application Specific Integrated Circuit), an FPGA (Field Programmable Gate Array) or other programmable logic devices, transistor logic devices, hardware components, or any combination thereof. It may implement or execute the various exemplary logical blocks, modules and circuits described in connection with this disclosure. The processor 4001 can also be a combination that implements computing functions, such as a combination of one or more microprocessors, a combination of a DSP and a microprocessor, and the like. Each "module" herein may comprise circuitry, such as processing circuitry.

The bus 4002 may include a path to transfer information between the components described above. The bus 4002 may be a PCI (Peripheral Component Interconnect) bus or an EISA (Extended Industry Standard Architecture) bus or the like. The bus 4002 can be divided into an address bus, a data bus, a control bus, and the like. For ease of representation, only one thick line is shown in FIG. 23, but it does not mean that there is only one bus or one type of bus.

The memory 4003 may be a ROM (Read Only Memory) or other types of static storage devices that can store static information and instructions, a RAM (Random Access Memory) or other types of dynamic storage devices that can store information and instructions, and can also be EEPROM (Electrically Erasable Programmable Read Only Memory), CD-ROM (Compact Disc Read Only Memory) or other optical disk storage, compact disk storage (including compressed compact disc, laser disc, compact disc, digital versatile disc, blue-ray disc, etc.), magnetic disk storage media, other magnetic storage devices, or any other medium capable of carrying or storing computer programs and capable of being read by a computer, without limitation.

The memory 4003 is used for storing computer programs for executing the embodiments of the present disclosure, and the execution is controlled by the processor 4001. The processor 2401 is configured to execute the computer programs stored in the memory 2403 to implement the steps shown in the foregoing method embodiments.

Figure 24:
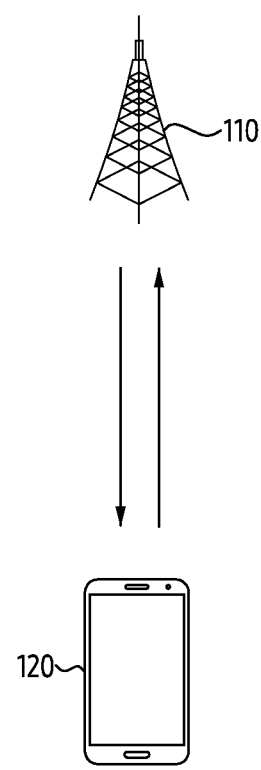
FIG. 24 illustrates a wireless communication system according to an embodiment of the disclosure.

FIG. 24 illustrates a wireless communication system according to an embodiment of the disclosure.

Referring to FIG. 24, it illustrates a base station 110 and a terminal 120 as parts of nodes using a wireless channel in a wireless communication system. Although FIG. 24 illustrates only one base station, the wireless communication system may further include another base station that is the same as or similar to the base station 110.

The base station 110 is a network infrastructure that provides wireless access to the terminal 120. The base station 110 may have a coverage defined based on a distance capable of transmitting a signal. In addition to the term 'base station', the base station 110 may be referred to as 'access point (AP), 'eNodeB (eNB)', '5th generation node', 'next generation nodeB (gNB)', 'wireless point', 'transmission/reception', or other terms having the same or equivalent meaning thereto.

The terminal 120, which is a device used by a user, performs communications with the base station 110 through a wireless channel. A link from the base station 110 to the terminal 120 is referred to as a downlink (DL), and a link from the terminal 120 to the base station 110 is referred to as an uplink (UL). Further, although not shown in FIG. 24, the terminal 120 and other terminals may perform communications with each other through the wireless channel. In this context, a link between the terminal 120 and another terminals (device-to-device link, D2D) is referred to as a side link, and the side link may be used mixed with a PC5 interface. In some other embodiments of the disclosure, the terminal 120 may be operated without any user's involvement. According to an embodiment of the disclosure, the terminal 120 is a device that performs machine-type communication (MTC) and may not be carried by a user. In addition, according to an embodiment of the disclosure, the terminal 120 may be a narrowband (NB)-Internet of things (IoT) device.

The terminal 120 may be referred to as 'user equipment (UE), 'customer premises equipment (CPE)', 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 110 and the terminal 120 may perform beamforming. In this context, the beamforming may include transmission beamforming and reception beamforming. The base station 110 and the terminal 120 may assign directionality to a transmission signal or a reception signal. To that end, the base station 110 and the terminal 120 may select serving beams through a beam search or beam management procedure. After the serving beams are selected, subsequent communication may be performed through a resource having a quasi-co located (QCL) relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 24, both the base station 110 and the terminal 120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is QCL, or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to reduce the installation costs of the base station, a structure has been proposed in which the DU and the RU of the base station are separated so that one or more RUs are connected to one DU through a wired network and one or more RUs geographically distributed are arranged to cover a specific area.

Figure 25:
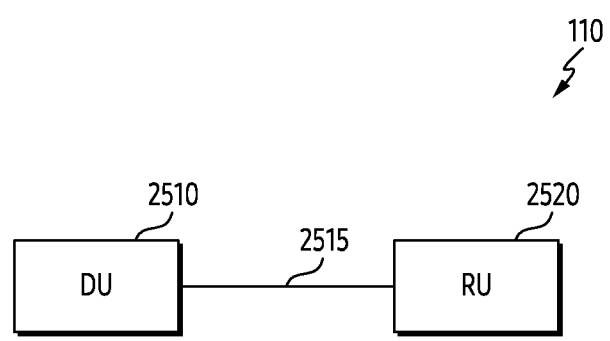
FIG. 25 illustrates a fronthaul interface according to an embodiment of the disclosure.

FIG. 25 illustrates a fronthaul interface according to an embodiment of the disclosure. A fronthaul refers to entities between a radio access network and a base station, as opposed to a backhaul between a base station and a core network. Although FIG. 25 illustrate an example of a fronthaul structure between the DU 2510 and one RU 2520, it is only for convenience of description and the disclosure is not limited thereto. In other words, an embodiment of the disclosure may also be applied to a fronthaul structure between one DU and a plurality of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 25, the base station 110 may include a DU 2510 and an RU 2520. The fronthaul 2515 between the DU 2510 and the RU 2520 may be operated through an Fx interface. For the operation of the fronthaul 2515, an interface, such as e.g., an enhanced common public radio interface (eCPRI) or a radio over ethernet (ROE) may be used.

Along with development of communication technology, the mobile data traffic has increased a great deal, and thus, the bandwidth requirement demanded by the fronthaul between the digital unit (DU) and the radio unit (RU) has increased significantly. In a deployment, such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 2510 may serve as an upper layer of a wireless network. For example, the DU 2510 may perform a function of a MAC layer and a part of the PHY layer. Here, the part of the PHY layer is performed at a higher level amongst the functions of the PHY layer, and may include, for example, channel encoding (or channel decoding), scrambling (or descrambling), modulation (or demodulation), or layer mapping (or layer de-mapping). According to an embodiment of the disclosure, when the DU 2510 conforms to the O-RAN standard, it may be referred to as an O-DU (O-RAN DU). The DU 2510 may be represented replaced by a first network entity for a base station (e.g., gNB) in embodiments of the disclosure, as occasion demands.

The RU 2520 may be responsible for lower layer functions of the wireless network. For example, the RU 2520 may perform a part of the PHY layer and the RF function. Here, the part of the PHY layer is performed at a relatively lower level than the DU 2510 amongst functions of the PHY layer, and may include, for example, iFFT transform (or FFT transform), CP insertion (CP removal), and digital beamforming. The RU 2520 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment of the disclosure, when the RU 2520 conforms to the O-RAN standard, it may be referred to as an O-RU (O-RAN RU). The RU 2520 may be represented replaced by a second network entity for a base station (e.g., gNB) in embodiments of the disclosure, as circumstance demands.

Although FIG. 25 describes that the base station 110 includes the DU 2510 and the RU 2520, the embodiments of the disclosure are not limited thereto. The base station according to embodiments of the disclosure may be implemented with a distributed deployment according to a centralized unit (CU) configured to perform a function of upper layers (e.g., packet data convergence protocol (PDCP), radio resource control (RRC)) of an access network, and a distributed unit (DU) configured to perform a function of a lower layer. In this occasion, the distributed unit (DU) may include a digital unit (DU) and a radio unit (RU) of FIG. 25. Between the core network (e.g., 5G core (5GC) or next generation core (NGC)) and the radio network (RAN), the deployment of the base station 110 may be implemented in the order of CU, DU, and RU. The interface between the CU and the distributed unit (DU) may be referred to as an F1 interface.

The CU may be connected to one or more DUs to act as a higher layer than the DU. For example, the CU may be responsible for the functions of radio resource control (RRC) and packet data convergence protocol (PDCP) layers, and the DU and the RU may be responsible for the functions of lower layers. For example, the DU may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the distributed unit (DU) according to implementation of a distributed arrangement of the base station. Further, as an example, the functions in the CU may be implemented in the digital unit (DU). Hereinafter, unless otherwise defined, the operations of the digital unit (DU) and the RU will be described, but it is to be noted that various embodiments of the disclosure may be applied to both a base station deployment including the CU and a deployment in which the DU is directly connected to a core network, that is, being incorporated into a base station (e.g., an NG-RAN node) where the CU and the DU are one entity.

In an example embodiment, a method performed by a base station is provided. The method comprises acquiring channel related information of a target user equipment (UE). The method comprises identifying whether the target UE corresponds to a first type UE or a second type UE based on at least one of the channel related information or position information of the target UE. The method comprises in case that the target UE corresponds to the first type UE, acquiring a modulation and coding scheme (MCS) based on MCS related information, wherein the MCS related information is obtained based on a first artificial intelligence (AI) network using the channel related information. The method comprises transmitting the MCS to the target UE. The number of available MCS change values of the first type UE is greater than the number of available MCS change values of the second type UE.

In an example embodiment, the acquiring of the MCS comprises transmitting, to a radio access network (RAN) intelligence controller (RIC), the channel related information. The acquiring of the MCS comprises receiving, from the RIC, the MCS related information. The first AI network is deployed on the RIC.

In an example embodiment, the method comprises, in case that the target UE is the second type UE, acquiring the MCS based on a fixed adjustment step for link adaptation and the channel related information. The first type UE comprises an edge UE and the second type UE comprises a center UE.

In an example embodiment, the acquiring of the MCS based on the MCS related information comprises predicting, by the first AI network, a short-term signal to interference plus noise ratio (SINR) offset corresponding to the target UE based on the channel related information. The acquiring of the MCS based on the MCS related information comprises acquiring the MCS related information corresponding to the target UE based on the short-term SINR offset. The acquiring of the MCS based on the MCS related information comprises determining the MCS corresponding to the target UE based on the MCS related information.

In an example embodiment, the predicting, by the first AI network, the short-term SINR offset corresponding to the target UE based on the channel related information comprises acquiring first block error rate (BLER) information corresponding to the target UE based on a decoding feedback value fed back by the target UE, the first BLER information containing BLERs of different preset time windows under different preset SINR offsets, and predicting, by the first AI network, the short-term SINR offset corresponding to the target UE based on the first BLER information.

In an example embodiment, the predicting, by the first AI network, the short-term SINR offset corresponding to the target UE based on the first BLER information comprises acquiring a second BLER information based on a movement feature and/or position feature of the target UE and the first BLER information. The predicting, by the first AI network, the short-term SINR offset corresponding to the target UE based on the first BLER information comprises predicting, by the first AI network, the short-term SINR offset corresponding to the target UE based on the second BLER information.

In an example embodiment, the acquiring of the second BLER information based on the movement feature and/or position feature of the target UE and the first BLER information comprises selecting, based on the movement feature of the target UE, an effective preset time window from the preset time window contained in the first BLER information, and/or selecting, based on the position feature of the target UE, an effective preset SINR offset from the preset SINR offset of the first BLER information. The acquiring of the second BLER information based on a movement feature and/or position feature of the target UE and the first BLER information comprises determining the second BLER information based on the effective preset time window and/or the effective preset SINR offset.

In an example embodiment, the method comprises predicting, by a second AI network, a long-term SINR corresponding to the target UE based on the channel related information. The acquiring of the MCS related information corresponding to the target UE based on the short-term SINR offset comprises acquiring the MCS related information corresponding to the target UE based on the short-term SINR offset and the long-term SINR.

In an example embodiment, a device of a base station is provided. The device comprises a memory storing instructions, at least one processor for executing the instructions, and at least one transceiver coupled to the at least one processor. The at least one processor is configured to acquire channel related information of a target user equipment (UE). The at least one processor is configured to identify whether the target UE corresponds to a first type UE or a second type UE based on at least one of the channel related information or position information of the target UE. The at least one processor is configured to in case that the target UE corresponds to the first type UE, acquire a modulation and coding scheme (MCS) based on MCS related information, wherein the MCS related information is obtained based on a first artificial intelligence (AI) network using the channel related information. The at least one processor is configured to transmit the MCS to the target UE. The number of available MCS change values of the first type UE is greater than the number of available MCS change values of the second type UE.

In an example embodiment, the at least one processor is, to acquire the MCS, configured to transmit, to a radio access network (RAN) intelligence controller (RIC), the channel related information. The at least one processor is, to acquire the MCS, configured to receive, from the RIC, the MCS related information. The first AI network is deployed on the RIC.

In an example embodiment, the at least one processor is, to acquire the MCS, configured to, in case that the target UE is the second type UE, acquire the MCS based on a fixed adjustment step and the channel related information. The first type UE comprises an edge UE and the second type UE comprises a center UE. In an example embodiment, the at least one processor is, to acquire the MCS, configured to predict, by the first AI network, a short-term signal to interference plus noise ratio (SINR) offset corresponding to the target UE based on the channel related information. The at least one processor is, to acquire the MCS, configured to acquire the MCS related information corresponding to the target UE based on the short-term SINR offset. The at least one processor is, to acquire the MCS, configured to determine the MCS corresponding to the target UE based on the MCS related information.

In an example embodiment, the at least one processor is, to predict, by the first AI network, the short-term SINR offset corresponding to the target UE based on the channel related information, configured to acquire first block error rate (BLER) information corresponding to the target UE based on a decoding feedback value fed back by the target UE, the first BLER information containing BLERs of different preset time windows under different preset SINR offsets. The at least one processor is, to predict, by the first AI network, the short-term SINR offset corresponding to the target UE based on the channel related information, configured to predict, by the first AI network, the short-term SINR offset corresponding to the target UE based on the first BLER information.

In an example embodiment, the at least one processor is, to predict, by the first AI network, the short-term SINR offset corresponding to the target UE based on the first BLER information, configured to acquire a second BLER information based on a movement feature and/or position feature of the target UE and the first BLER information. at least one processor is, to predict, by the first AI network, the short-term SINR offset corresponding to the target UE based on the first BLER information, configured to predict, by the first AI network, the short-term SINR offset corresponding to the target UE based on the second BLER information.

In an example embodiment, the at least one processor is, to acquire the second BLER information, configured to select, based on the movement feature of the target UE, an effective preset time window from the preset time window contained in the first BLER information, and/or selecting, based on the position feature of the target UE, an effective preset SINR offset from the preset SINR offset of the first BLER information. The at least one processor is, to acquire the second BLER information, configured to determine the second BLER information based on the effective preset time window and/or the effective preset SINR offset.

In an example embodiment, the at least one processor is further configured to predict, by a second AI network, a long-term SINR corresponding to the target UE based on the channel related information. The at least one processor is configured to acquire the MCS related information corresponding to the target UE based on the short-term SINR offset and the long-term SINR.

In an example embodiment, a network node, comprises a memory storing instructions, at least one processor for executing the instructions, and at least one transceiver coupled to the at least one processor. The at least one processor is configured to acquire channel related information of a target user equipment (UE). The at least one processor is configured to acquire, by an AI network, MCS related information corresponding to the target UE based on the channel related information. The at least one processor is configured to transmit the MCS related information to a base station. The MCS Related information is used to determine an MCS for a wireless channel between the target UE and the base station. The target UE comprises a first type UE among the first type UE and a second type UE. The number of available MCS change values of the first type UE is greater than the number of available MCS change values of the second type UE.

In an example embodiment, the at least one processor, is to acquire the channel related information comprises receiving, from the base station, the channel related information. The at least one processor, is to acquire the MCS related information comprises calculating the MCS related information based on a signal to interference plus noise ratio (SINR) offset. The SINR offset is obtained based on the channel related information.

In an example embodiment, the first type UE is associated with the AI network and the second type UE is associated with a fixed adjustment step for link adaptation. The first type UE comprises an edge UE and the second type UE comprises a center UE.

In an example embodiment, the network node comprises a radio access network (RAN) intelligence controller (RIC).

Embodiments of the present disclosure provide a computer-readable storage medium having a computer program stored on the computer-readable storage medium, the computer program, when executed by a processor, implements the steps and corresponding contents of the foregoing method embodiments.

Embodiments of the present disclosure also provide a computer program product including a computer program, the computer program when executed by a processor realizing the steps and corresponding contents of the preceding method embodiments.

The terms "first", "second", "third", "fourth", "1", "2", etc. (if present) in the specification and claims of this disclosure and the accompanying drawings above are used to distinguish similar objects and need not be used to describe a particular order or sequence. It should be understood that the data so used is interchangeable where appropriate so that embodiments of the present disclosure described herein can be implemented in an order other than that illustrated or described in the text.

It should be understood that while the flow diagrams of embodiments of the present disclosure indicate the individual operational steps by arrows, the order in which these steps are performed is not limited to the order indicated by the arrows. Unless explicitly stated herein, in some implementation scenarios of embodiments of the present disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and the embodiments of the present disclosure are not limited thereto.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

The above text and accompanying drawings are provided as examples only to assist the reader in understanding the present disclosure. They are not intended and should not be construed as limiting the scope of the present disclosure in any way. Although certain embodiments and examples have been provided, based on what is disclosed herein, it will be apparent to those skilled in the art that the embodiments and examples shown may be altered without departing from the scope of the present disclosure. Other similar means of implementation based on the technical ideas of the present disclosure also fall within the protection scope of embodiments of the present disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a base station, the method comprising:
    acquiring channel related information of a target user equipment (UE);
    identifying whether the target UE corresponds to a first type UE or a second type UE based on at least one of the channel related information or position information of the target UE;
    in case that the target UE corresponds to the first type UE, acquiring a modulation and coding scheme (MCS) based on MCS related information, wherein the MCS related information is obtained based on a first artificial intelligence (AI) network using the channel related information; and
    transmitting the MCS to the target UE,
    wherein the number of available MCS change values of the first type UE is greater than the number of available MCS change values of the second type UE.

2. The method of claim 1, wherein the acquiring of the MCS comprises:
    transmitting, to a radio access network (RAN) intelligence controller (RIC), the channel related information, and receiving, from the RIC, the MCS related information, and wherein the first AI network is deployed on the RIC.

3. The method of claim 1, further comprising;
in case that the target UE is the second type UE, acquiring the MCS based on a fixed adjustment step for link adaptation and the channel related information, and
wherein the first type UE comprises an edge UE and the second type UE comprises a center UE.

4. The method of claim 1, wherein the acquiring of the MCS based on the MCS related information comprises:
predicting, by the first AI network, a short-term signal to interference plus noise ratio (SINR) offset corresponding to the target UE based on the channel related information;
acquiring the MCS related information corresponding to the target UE based on the short-term SINR offset; and
determining the MCS corresponding to the target UE based on the MCS related information.

5. The method of claim 4, wherein the predicting, by the first AI network, the short-term SINR offset corresponding to the target UE based on the channel related information comprises:
acquiring first block error rate (BLER) information corresponding to the target UE based on a decoding feedback value fed back by the target UE, the first BLER information containing BLERs of different preset time windows under different preset SINR offsets; and
predicting, by the first AI network, the short-term SINR offset corresponding to the target UE based on the first BLER information.

6. The method of claim 5, wherein the predicting, by the first AI network, the short-term SINR offset corresponding to the target UE based on the first BLER information comprises:
acquiring a second BLER information based on a movement feature and/or position feature of the target UE and the first BLER information; and
predicting, by the first AI network, the short-term SINR offset corresponding to the target UE based on the second BLER information.

7. The method of claim 6, wherein the acquiring of the second BLER information based on the movement feature and/or position feature of the target UE and the first BLER information comprises:
selecting, based on the movement feature of the target UE, an effective preset time window from the preset time window contained in the first BLER information, and/or selecting, based on the position feature of the target UE, an effective preset SINR offset from the preset SINR offset of the first BLER information; and
determining the second BLER information based on the effective preset time window and/or the effective preset SINR offset.

8. The method of claim 4, further comprising:
predicting, by a second AI network, a long-term SINR corresponding to the target UE based on the channel related information, and
wherein the acquiring of the MCS related information corresponding to the target UE based on the short-term SINR offset comprises:
acquiring the MCS related information corresponding to the target UE based on the short-term SINR offset and the long-term SINR.

9. A device of a base station comprising:
a memory storing instructions;
at least one processor for executing the instructions; and
at least one transceiver coupled to the at least one processor,
wherein the at least one processor is configured to:
acquire channel related information of a target user equipment (UE);
identify whether the target UE corresponds to a first type UE or a second type UE based on at least one of the channel related information or position information of the target UE;
in case that the target UE corresponds to the first type UE, acquire a modulation and coding scheme (MCS) based on MCS related information, wherein the MCS related information is obtained based on a first artificial intelligence (AI) network using the channel related information; and
transmit the MCS to the target UE,
wherein the number of available MCS change values of the first type UE is greater than the number of available MCS change values of the second type UE.

10. The device of claim 9, wherein the at least one processor is, to acquire the MCS, configured to:
transmit, to a radio access network (RAN) intelligence controller (RIC), the channel related information, and
receive, from the RIC, the MCS related information, and
wherein the first AI network is deployed on the RIC.

11. The device of claim 9,
wherein the at least one processor is, to acquire the MCS, configured to:
in case that the target UE is the second type UE, acquire the MCS based on a fixed adjustment step and the channel related information, and
wherein the first type UE comprises an edge UE and the second type UE comprises a center UE.

12. The device of claim 9, wherein the at least one processor is, to acquire the MCS, configured to:
predict, by the first AI network, a short-term signal to interference plus noise ratio (SINR) offset corresponding to the target UE based on the channel related information;
acquire the MCS related information corresponding to the target UE based on the short-term SINR offset; and
determine the MCS corresponding to the target UE based on the MCS related information.

13. The device of claim 12, wherein the at least one processor is, to predict, by the first AI network, the short-term SINR offset corresponding to the target UE based on the channel related information, configured to:
acquire first block error rate (BLER) information corresponding to the target UE based on a decoding feedback value fed back by the target UE, the first BLER information containing BLERs of different preset time windows under different preset SINR offsets; and
predict, by the first AI network, the short-term SINR offset corresponding to the target UE based on the first BLER information.

14. The device of claim 13, wherein the at least one processor is, to predict, by the first AI network, the short-term SINR offset corresponding to the target UE based on the first BLER information, configured to:
acquire a second BLER information based on a movement feature and/or position feature of the target UE and the first BLER information; and
predict, by the first AI network, the short-term SINR offset corresponding to the target UE based on the second BLER information.

15. The device of claim 14, wherein the at least one processor is, to acquire the second BLER information, configured to:
  select, based on the movement feature of the target UE, an effective preset time window from the preset time window contained in the first BLER information, and/or selecting, based on the position feature of the target UE, an effective preset SINR offset from the preset SINR offset of the first BLER information; and
  determine the second BLER information based on the effective preset time window and/or the effective preset SINR offset.

16. The device of claim 12, wherein the at least one processor is further configured to predict, by a second AI network, a long-term SINR corresponding to the target UE based on the channel related information, and
  wherein the at least one processor is configured to acquire the MCS related information corresponding to the target UE based on the short-term SINR offset and the long-term SINR.

17. A network node, comprising:
  a memory storing instructions;
  at least one processor, comprising processing circuitry, for executing the instructions; and
  at least one transceiver coupled to the at least one processor,
  wherein the at least one processor is individually and/or collectively configured to:
  acquire channel related information of a target user equipment (UE);
  acquire, by an AI network, modulation and coding scheme (MCS) related information corresponding to the target UE based on the channel related information; and
  transmit the MCS related information to a base station, and
  wherein the MCS Related information is used to determine an MCS for a wireless channel between the target UE and the base station,
  wherein the target UE comprises a first type UE among the first type UE and a second type UE, and
  wherein the number of available MCS change values of the first type UE is greater than the number of available MCS change values of the second type UE.

18. The network node of claim 17,
  wherein the at least one processor, is to acquire the channel related information comprises receiving, from the base station, the channel related information,
  wherein the at least one processor, is to acquire the MCS related information comprises calculating the MCS related information based on a signal to interference plus noise ratio (SINR) offset, and
  wherein the SINR offset is obtained based on the channel related information.

19. The network node of claim 17,
  wherein the first type UE is associated with the AI network and the second type UE is associated with a fixed adjustment step for link adaptation, and
  wherein the first type UE comprises an edge UE and the second type UE comprises a center UE.

20. The network node of claim 17, wherein the network node comprises a radio access network (RAN) intelligence controller (RIC).

* * * * *